(12) United States Patent
Wietfeldt et al.

(10) Patent No.: US 9,135,197 B2
(45) Date of Patent: *Sep. 15, 2015

(54) ASYNCHRONOUS INTERFACE FOR MULTI-RADIO COEXISTENCE MANAGER

(75) Inventors: Richard Dominic Wietfeldt, San Diego, CA (US); Hans Georg Gruber, San Diego, CA (US); George Chrisikos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 558 days.

This patent is subject to a terminal disclaimer.

(21) Appl. No.: 12/749,195

(22) Filed: Mar. 29, 2010

(65) Prior Publication Data

US 2011/0026458 A1 Feb. 3, 2011

Related U.S. Application Data

(60) Provisional application No. 61/229,626, filed on Jul. 29, 2009.

(51) Int. Cl.
*H04B 1/713* (2011.01)
*H04B 7/00* (2006.01)
*G06F 13/38* (2006.01)
*H04W 88/06* (2009.01)
*H04W 72/12* (2009.01)
*H04W 88/10* (2009.01)

(52) U.S. Cl.
CPC ............. *G06F 13/385* (2013.01); *H04W 88/06* (2013.01); *G06F 2213/3814* (2013.01); *H04W 72/1215* (2013.01); *H04W 88/10* (2013.01)

(58) Field of Classification Search
CPC .. H04W 72/1215; H04W 88/06; H04W 88/10
USPC .................................................. 455/500, 62
See application file for complete search history.

(56) References Cited

U.S. PATENT DOCUMENTS

| 4,933,845 A | 6/1990 | Hayes |
| 5,486,210 A | 1/1996 | Kerr et al. |

(Continued)

FOREIGN PATENT DOCUMENTS

| CN | 1449601 A | 10/2003 |
| CN | 1475064 A | 2/2004 |

(Continued)

OTHER PUBLICATIONS

Baghel, et al., "Coexistence Possibilities of LTE with ISM Technologies and GNSS," IEEE, 2011 International Conference on Communications, Jan. 28-30, 2011. p. 1-5.

(Continued)

*Primary Examiner* — Bobbak Safaipour
(74) *Attorney, Agent, or Firm* — Rupit M. Patel

(57) ABSTRACT

Systems and methodologies are described herein that facilitate an asynchronous bus architecture for multi-radio coexistence associated with a wireless device. As described herein, a system of buses operating in an asynchronous manner, combined with optional on-chip and/or other supplemental buses, can be utilized to couple respective radios and/or other related endpoints to a coexistence management platform, thereby facilitating management of coexistence between multiple radios in a unified and scalable manner. As further described herein, communication between a coexistence manager and its respective managed endpoints can be facilitated through the use of a single bus or multiple buses that can be switched and/or otherwise operate in a concurrent manner to facilitate expedited conveyance of radio event notifications and their corresponding responses.

33 Claims, 17 Drawing Sheets

(56) References Cited

U.S. PATENT DOCUMENTS

| | | | |
|---|---|---|---|
| 5,726,893 A | 3/1998 | Schuchman et al. | |
| 6,128,483 A | 10/2000 | Doiron et al. | |
| 6,571,285 B1 | 5/2003 | Groath et al. | |
| 6,944,430 B2 | 9/2005 | Berstis | |
| 7,035,314 B1 | 4/2006 | Linsky | |
| 7,317,900 B1 | 1/2008 | Linde et al. | |
| 7,324,815 B2 | 1/2008 | Ross et al. | |
| 7,339,446 B2 | 3/2008 | Su et al. | |
| 7,412,250 B2 | 8/2008 | Fukuda | |
| 7,433,970 B1 | 10/2008 | Euler et al. | |
| 7,440,728 B2 | 10/2008 | Abhishek et al. | |
| 7,454,171 B2 | 11/2008 | Palin et al. | |
| 7,623,879 B2 | 11/2009 | Honkanen et al. | |
| 7,685,325 B2* | 3/2010 | Batchelor et al. | 710/8 |
| 7,786,755 B2* | 8/2010 | Yao et al. | 326/31 |
| 7,809,012 B2* | 10/2010 | Ruuska et al. | 370/449 |
| 7,903,642 B2* | 3/2011 | Voutilainen et al. | 370/354 |
| 7,929,432 B2 | 4/2011 | Zhu et al. | |
| 7,990,882 B1 | 8/2011 | Bedair et al. | |
| 7,990,992 B2* | 8/2011 | Muukki et al. | 370/419 |
| 8,059,553 B2 | 11/2011 | Leung et al. | |
| 8,060,085 B2 | 11/2011 | Goulder et al. | |
| 8,095,176 B2 | 1/2012 | Sudak | |
| 8,184,154 B2 | 5/2012 | Estevez et al. | |
| 8,340,706 B2 | 12/2012 | Zetterman et al. | |
| 8,660,548 B1 | 2/2014 | Lambert | |
| 2002/0080728 A1 | 6/2002 | Sugar et al. | |
| 2002/0129184 A1 | 9/2002 | Watanabe | |
| 2002/0167963 A1 | 11/2002 | Joa-Ng | |
| 2003/0135675 A1* | 7/2003 | Pontius et al. | 710/107 |
| 2003/0139136 A1 | 7/2003 | Pattabiraman | |
| 2003/0231741 A1 | 12/2003 | Rancu et al. | |
| 2004/0022210 A1 | 2/2004 | Frank et al. | |
| 2004/0023674 A1 | 2/2004 | Miller | |
| 2004/0028003 A1 | 2/2004 | Diener et al. | |
| 2004/0028123 A1 | 2/2004 | Sugar et al. | |
| 2004/0029619 A1 | 2/2004 | Liang et al. | |
| 2004/0052272 A1 | 3/2004 | Frank | |
| 2004/0137915 A1 | 7/2004 | Diener et al. | |
| 2004/0192222 A1 | 9/2004 | Vaisanen et al. | |
| 2004/0259589 A1 | 12/2004 | Bahl et al. | |
| 2005/0047038 A1 | 3/2005 | Nakajima et al. | |
| 2005/0099943 A1 | 5/2005 | Naghian et al. | |
| 2005/0239497 A1 | 10/2005 | Bahl et al. | |
| 2005/0277387 A1 | 12/2005 | Kojima et al. | |
| 2005/0289092 A1 | 12/2005 | Sumner et al. | |
| 2006/0013176 A1 | 1/2006 | De et al. | |
| 2006/0025181 A1 | 2/2006 | Kalofonos et al. | |
| 2006/0026051 A1 | 2/2006 | Rose | |
| 2006/0089119 A1 | 4/2006 | Lipasti et al. | |
| 2006/0101033 A1 | 5/2006 | Hu et al. | |
| 2006/0126702 A1 | 6/2006 | Burdett | |
| 2006/0152335 A1 | 7/2006 | Helgeson | |
| 2006/0160563 A1 | 7/2006 | Ku | |
| 2006/0166628 A1 | 7/2006 | Anttila | |
| 2006/0233191 A1 | 10/2006 | Pirzada et al. | |
| 2006/0292986 A1 | 12/2006 | Bitran et al. | |
| 2007/0105548 A1 | 5/2007 | Mohan et al. | |
| 2007/0124005 A1 | 5/2007 | Bourakov et al. | |
| 2007/0125162 A1 | 6/2007 | Ghazi et al. | |
| 2007/0135162 A1 | 6/2007 | Banerjea et al. | |
| 2007/0153702 A1 | 7/2007 | Khan Alicherry et al. | |
| 2007/0165754 A1 | 7/2007 | Kiukkonen et al. | |
| 2007/0206631 A1 | 9/2007 | Parts et al. | |
| 2007/0232349 A1 | 10/2007 | Jones et al. | |
| 2007/0248114 A1 | 10/2007 | Jia et al. | |
| 2007/0255850 A1 | 11/2007 | Gould et al. | |
| 2007/0281617 A1 | 12/2007 | Meylan et al. | |
| 2008/0019339 A1 | 1/2008 | Raju et al. | |
| 2008/0045152 A1 | 2/2008 | Boes | |
| 2008/0057910 A1 | 3/2008 | Thoresson et al. | |
| 2008/0066019 A1 | 3/2008 | Worek et al. | |
| 2008/0109581 A1* | 5/2008 | Pham et al. | 710/58 |
| 2008/0130580 A1 | 6/2008 | Chaponniere et al. | |
| 2008/0161041 A1 | 7/2008 | Pernu | |
| 2008/0192806 A1 | 8/2008 | Wyper et al. | |
| 2008/0200120 A1* | 8/2008 | Ruuska et al. | 455/41.2 |
| 2008/0227456 A1 | 9/2008 | Huang et al. | |
| 2008/0232339 A1 | 9/2008 | Yang et al. | |
| 2008/0254745 A1 | 10/2008 | Zhang et al. | |
| 2008/0279137 A1 | 11/2008 | Pernu et al. | |
| 2008/0279155 A1 | 11/2008 | Pratt, Jr. et al. | |
| 2008/0287158 A1 | 11/2008 | Rayzman et al. | |
| 2008/0298643 A1 | 12/2008 | Lawther et al. | |
| 2008/0311912 A1 | 12/2008 | Balasubramanian et al. | |
| 2009/0033550 A1 | 2/2009 | Wolf | |
| 2009/0040937 A1 | 2/2009 | Xhafa et al. | |
| 2009/0046625 A1 | 2/2009 | Diener et al. | |
| 2009/0061781 A1 | 3/2009 | Zhang | |
| 2009/0116437 A1 | 5/2009 | Alexandre et al. | |
| 2009/0116573 A1 | 5/2009 | Gaal et al. | |
| 2009/0137206 A1 | 5/2009 | Sherman et al. | |
| 2009/0149135 A1 | 6/2009 | Mangold et al. | |
| 2009/0176454 A1 | 7/2009 | Chen et al. | |
| 2009/0180451 A1 | 7/2009 | Alpert et al. | |
| 2009/0196210 A1 | 8/2009 | Desai | |
| 2009/0215404 A1 | 8/2009 | Kesavan et al. | |
| 2009/0239471 A1 | 9/2009 | Tran et al. | |
| 2009/0252053 A1 | 10/2009 | Leith et al. | |
| 2009/0252128 A1 | 10/2009 | Yang et al. | |
| 2009/0257380 A1 | 10/2009 | Meier | |
| 2009/0262785 A1 | 10/2009 | Wilhelmsson | |
| 2009/0303975 A1 | 12/2009 | Xhafa et al. | |
| 2009/0310501 A1 | 12/2009 | Catovic et al. | |
| 2009/0310661 A1 | 12/2009 | Kloper et al. | |
| 2009/0323652 A1 | 12/2009 | Chen et al. | |
| 2010/0085951 A1 | 4/2010 | Pernu et al. | |
| 2010/0130129 A1 | 5/2010 | Chang et al. | |
| 2010/0137025 A1 | 6/2010 | Tal et al. | |
| 2010/0141399 A1 | 6/2010 | Swope | |
| 2010/0142500 A1 | 6/2010 | Sudak | |
| 2010/0153760 A1 | 6/2010 | Gupta et al. | |
| 2010/0158037 A1 | 6/2010 | Heinke et al. | |
| 2010/0197235 A1 | 8/2010 | Wilhelmsson | |
| 2010/0203832 A1 | 8/2010 | Russell et al. | |
| 2010/0241727 A1 | 9/2010 | Bourakov et al. | |
| 2010/0273426 A1 | 10/2010 | Walley et al. | |
| 2010/0273504 A1 | 10/2010 | Bull et al. | |
| 2010/0304685 A1 | 12/2010 | Wietfeldt et al. | |
| 2010/0304770 A1 | 12/2010 | Wietfeldt et al. | |
| 2010/0311455 A1 | 12/2010 | Armstrong et al. | |
| 2010/0316027 A1 | 12/2010 | Rick et al. | |
| 2010/0322287 A1* | 12/2010 | Truong et al. | 375/133 |
| 2010/0329161 A1* | 12/2010 | Ylanen et al. | 370/310 |
| 2010/0329162 A1 | 12/2010 | Kadous et al. | |
| 2010/0330977 A1 | 12/2010 | Kadous et al. | |
| 2010/0331029 A1 | 12/2010 | Linsky et al. | |
| 2011/0007680 A1 | 1/2011 | Kadous et al. | |
| 2011/0007688 A1 | 1/2011 | Veeravalli et al. | |
| 2011/0009136 A1 | 1/2011 | Mantravadi et al. | |
| 2011/0026432 A1* | 2/2011 | Gruber et al. | 370/254 |
| 2011/0065402 A1 | 3/2011 | Kraft et al. | |
| 2011/0105027 A1 | 5/2011 | Linsky | |
| 2011/0116490 A1 | 5/2011 | Wilhelmsson et al. | |
| 2011/0199989 A1 | 8/2011 | Wietfeldt et al. | |
| 2011/0212288 A1 | 9/2011 | McClure et al. | |
| 2011/0249603 A1 | 10/2011 | Rick et al. | |
| 2011/0312288 A1 | 12/2011 | Fu et al. | |
| 2012/0034870 A9 | 2/2012 | Desai et al. | |
| 2012/0129457 A1 | 5/2012 | Linsky | |
| 2012/0213303 A1 | 8/2012 | Kadous et al. | |
| 2012/0230303 A1 | 9/2012 | Guo et al. | |
| 2012/0270595 A1 | 10/2012 | Yang et al. | |

FOREIGN PATENT DOCUMENTS

| | | |
|---|---|---|
| CN | 1592088 A | 3/2005 |
| CN | 1666189 A | 9/2005 |
| CN | 1689194 A | 10/2005 |
| CN | 1716900 A | 1/2006 |
| CN | 1741484 A | 3/2006 |
| CN | 1887018 A | 12/2006 |
| CN | 1893299 A | 1/2007 |
| CN | 101132368 A | 2/2008 |

(56) References Cited

FOREIGN PATENT DOCUMENTS

| | | |
|---|---|---|
| CN | 101170315 A | 4/2008 |
| CN | 101262254 A | 9/2008 |
| CN | 101361279 A | 2/2009 |
| CN | 101378355 A | 3/2009 |
| CN | 101453759 A | 6/2009 |
| DE | 19602535 C1 | 9/1996 |
| EP | 1220460 A2 | 7/2002 |
| EP | 1489788 A2 | 12/2004 |
| EP | 1551080 A1 | 7/2005 |
| EP | 1589781 | 10/2005 |
| EP | 1659814 A1 | 5/2006 |
| EP | 1681772 A1 | 7/2006 |
| EP | 1703675 A1 | 9/2006 |
| EP | 1705936 | 9/2006 |
| EP | 1729464 A1 | 12/2006 |
| EP | 1959619 A2 * | 8/2008 |
| EP | 2068452 | 6/2009 |
| GB | 2412817 A | 10/2005 |
| JP | S61110250 A | 5/1986 |
| JP | H05336141 A | 12/1993 |
| JP | H0721114 A | 1/1995 |
| JP | 08055495 | 2/1996 |
| JP | 9501814 A | 2/1997 |
| JP | 2003199160 A | 7/2003 |
| JP | 2003234745 A | 8/2003 |
| JP | 2003298598 A | 10/2003 |
| JP | 2004129143 A | 4/2004 |
| JP | 2005012815 A | 1/2005 |
| JP | 2005529549 A | 9/2005 |
| JP | 2005328520 A | 11/2005 |
| JP | 2006211242 A | 8/2006 |
| JP | 2007503733 A | 2/2007 |
| JP | 2007129711 A | 5/2007 |
| JP | 2007202176 A | 8/2007 |
| JP | 2007523519 A | 8/2007 |
| JP | 2008521309 A | 6/2008 |
| JP | 2008153984 A | 7/2008 |
| JP | 2008219444 A | 9/2008 |
| JP | 2009500988 A | 1/2009 |
| JP | 2009042887 A | 2/2009 |
| JP | 2009534972 A | 9/2009 |
| JP | 2010504677 A | 2/2010 |
| JP | 2010531565 A | 9/2010 |
| KR | 20040111157 A | 12/2004 |
| KR | 20060047429 A | 5/2006 |
| TW | I264209 B | 10/2006 |
| TW | 200820800 A | 5/2008 |
| TW | I309953 B | 5/2009 |
| WO | WO9422239 | 9/1994 |
| WO | 9527381 A1 | 10/1995 |
| WO | WO0230133 A2 | 4/2002 |
| WO | WO03105418 | 12/2003 |
| WO | WO2004006461 A1 | 1/2004 |
| WO | WO-2005062815 A2 | 7/2005 |
| WO | WO2007008981 | 1/2007 |
| WO | 2007063901 A1 | 6/2007 |
| WO | WO-2007083205 A2 | 7/2007 |
| WO | 2007122297 A1 | 11/2007 |
| WO | WO2007138375 | 12/2007 |
| WO | WO2008000905 | 1/2008 |
| WO | 2008024713 A2 | 2/2008 |
| WO | WO-2008041071 A2 | 4/2008 |
| WO | WO2008070777 | 6/2008 |
| WO | WO2010080669 | 7/2010 |
| WO | WO2011002795 A1 | 1/2011 |
| WO | WO2011006130 A1 | 1/2011 |
| WO | WO2011008557 A1 | 1/2011 |
| WO | WO2011061164 A2 | 5/2011 |

OTHER PUBLICATIONS

Bluetooth Sig, Inc. "Bluetooth Specification Version 3.0 + HS, Core System Package, Part B Baseband Specification", vol. 2 Apr. 21, 2009, pp. 68-85, XP002622397, Retrieved from the Internet: URL: http://www.bluetooth.com/Specification %20Documents/Core_V30_HS.zip.

Coen Bron, et al., Algorithm 457: Finding All Cliques of an Undirected Graph, Communications of the ACM, 16(9): 575-577, 1973.

F. Cazals, C. Karande, A note on the problem of reporting maximal cliques, Theoretical Computer Science, vol. 407, Issues 1-3, Nov. 6, 2008, pp. 564-568.

Hong, et al., "Exploring multiple radios and multiple channels in wireless mesh networks [Accepted from Open Call]", IEEE Wireless Communications, IEEE Service Center, Piscataway, NJ, US, vol. 17, No. 3, Jun. 1, 2010, pp. 76-85, XP011311811, ISSN: 1536-1284.

International Search Report and Written Opinion—PCT/US2010/043589, International Search Authority—European Patent Office—Nov. 12, 2010.

Juha B. et al.,"Slimbus: An Audio, Data and Control Interface for Mobile Devices" Conference: 29th International Conference: Audio for Mobile and Handheld Devices; Sep. 2006, AES, 60 East 42nd Street, Room 2520 New York 10165-2520, USA, Sep. 1, 2006, XP040507958 Section 2.6.

Ramachandran, et al., "Interference-Aware Channel Assignment in Multi-Radio Wireless Mesh Networks", INFOCOM 2006, 25th IEEE International Conference on Computer Communications, Proceedings, IEEE Piscataway, NJ, Apr. 1, 2006, pp. 1-12, XP031072217, DOI: 10.1109/INFOCOM.2006.177, ISBN: 978-1-4244-0221-2.

Stefan Geirhofer, et al., "Cognitive frequency hopping based on interference prediction: theory and experimental results" Mobile Computing and Communications Review, ACM, New York, NY, US LNKD-DOI: 10.1145/1621076.1621082, vol. 13, No. 2, Apr. 1, 2009, pp. 49-61, XP001555779, ISSN: 1091-1669.

dB or not dB? Everything you ever wanted to know about decibels but were afraid to ask . . . Application Note 1 MA98, Oct. 2005, Rohde & Schwarz. located at http://www2.rohde-schwarz.com/file~561311MA98-4E.

Stefan, G., et al., "Congnitive Frequency Hopping Based On Interference Prediction: Theory And Experimental Results", Mobile Computing and Communications Review, vol. 13, No. 2, pp. 49 to 51, Apr. 2009.

Taiwan Search Report—TW099117627—TIPO—Apr. 7, 2013.
Taiwan Search Report—TW099122728—TIPO—May 20, 2013.

* cited by examiner

ASYNCHRONOUS INTERFACE FOR
MULTI-RADIO COEXISTENCE MANAGER

CROSS-REFERENCE

This application claims the benefit of U.S. Provisional Application Ser. No. 61/229,626, filed Jul. 29, 2009, and entitled "ASYNCHRONOUS INTERFACE FOR MULTI-RADIO COEXISTENCE MANAGER," the entirety of which is incorporated herein by reference.

BACKGROUND

I. Field

The present disclosure relates generally to wireless communications, and more specifically to managing coexistence between multiple radios utilized by respective devices in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and Single-Carrier FDMA (SC-FDMA) systems.

Generally, a wireless multiple-access communication system can include a number of radios to support communication with different wireless communication systems. Respective radios can operate on certain frequency channels or bands or can have respective predefined requirements. In order to manage communication via multiple radios and avoid collisions and/or interference between respective radios, it would be desirable to implement mechanisms to coordinate between respective radios that are in collision (e.g., radios configured such that their mutual operation would cause significant interference on at least one of the radios). Further, it would be desirable to implement bus structures and/or other means for facilitating communication between such mechanisms and respective radio endpoints that leverage such mechanisms.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying respective managed endpoints associated with respective potentially conflicting radio technologies and a multi-radio coexistence platform associated with the respective managed endpoints and maintaining a bus system that communicatively connects the respective managed endpoints to the multi-radio coexistence platform, wherein the bus system comprises one or more buses operating in an asynchronous manner.

A second aspect relates to an apparatus operable in a wireless communication system. The apparatus can comprise respective managed endpoints associated with a set of potentially conflicting radio technologies; a coexistence manager (CxM) that facilitates coexistence between the respective managed endpoints; and a bus system that communicatively connects the respective managed endpoints to the CxM, wherein the bus system comprises one or more buses operating in an asynchronous manner.

A third aspect relates to an apparatus, which can comprise means for identifying respective endpoints corresponding to a set of radio technologies and an application platform that manages coexistence between the set of radio technologies and their corresponding endpoints and means for maintaining a system of one or more buses operating in an asynchronous manner that facilitate communication between the respective endpoints and the application platform.

A fourth aspect described herein relates to a computer program product, which can include a computer-readable medium that comprises code for causing a computer to identify respective endpoints corresponding to a set of radio technologies and an application platform that manages coexistence between the set of radio technologies and their corresponding endpoints and code for causing a computer to maintain a system of one or more buses operating in an asynchronous manner that facilitate communication between the respective endpoints and the application platform.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
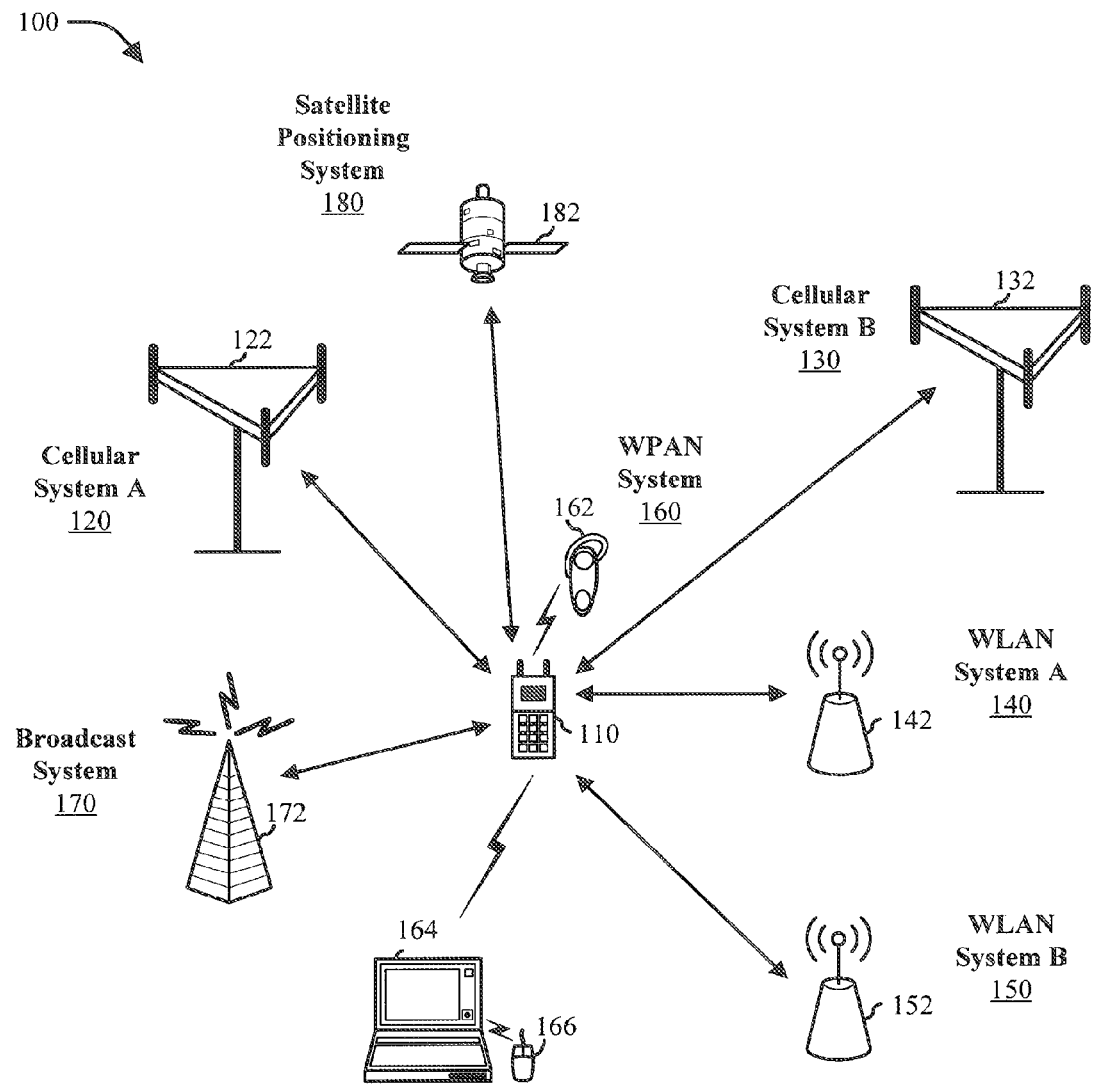
FIG. 1 is a block diagram of an example wireless communication environment in which various aspects described herein can function.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, it can be appreciated that various illustrative logical blocks, modules, circuits, algorithm steps, etc., described in connection with the disclosure herein can be implemented as electronic hardware, computer software, or combinations of both. To clearly illustrate this interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the disclosure herein can additionally or alternatively be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, or alternatively the processor can be any conventional processor, controller, microcontroller, state machine, or the like. A processor can also be implemented as a combination of computing devices, e.g., a combination of a DSP and a microprocessor, a plurality of microprocessors, one or more microprocessors in conjunction with a DSP core, or any other such configuration.

Furthermore, various functions of one or more example embodiments described herein can be implemented in hardware, software, firmware, or any combination thereof. If implemented in software, the functions can be stored on or transmitted as one or more instructions or code on a computer-readable medium. Computer-readable media can include both computer storage media and communication media. Communication media can include any medium that facilitates transfer of a computer program from one place to another. Likewise, storage media can include any available media that can be accessed by a general purpose or special purpose computer. By way of example, and not limitation, computer-readable media can comprise RAM, ROM, EEPROM, CD-ROM, digital versatile disc (DVD), blu-ray disc, or other optical disk storage, magnetic disk storage or other magnetic storage devices, and/or any other medium that can be used to carry or store desired program code means in the form of instructions or data structures and that can be accessed by a general-purpose or special-purpose computer or a general-purpose or special-purpose processor. Further, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and/or microwave, then such means are intended to be included in the definition of medium. "Disk" and "disc," as used herein, includes compact disc (CD), laser disc, optical disc, DVD, floppy disk, and blu-ray disc, where "disks" generally reproduce data magnetically while "discs" reproduce data optically (e.g., with lasers). Combinations of the above can also be included within the scope of computer-readable media.

Referring now to the drawings, FIG. 1 illustrates an example wireless communication environment 100 in which various aspects described herein can function. Wireless communication environment 100 can include a wireless device 110, which can be capable of communicating with multiple communication systems. These systems can include, for example, one or more cellular systems 120 and/or 130, one or more wireless local area network (WLAN) systems 140 and/or 150, one or more wireless personal area network (WPAN) systems 160, one or more broadcast systems 170, one or more satellite positioning systems 180, other systems not shown in FIG. 1, or any combination thereof. It should be appreciated that in the following description the terms "network" and "system" are often used interchangeably.

Cellular systems 120 and 130 can each be a CDMA, TDMA, FDMA, OFDMA, SC-FDMA, or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, cellular system 120 can include a number of base stations 122, which can support bi-directional communication for wireless devices within their coverage. Similarly, cellular system 130 can include a number of base stations 132 that can support bi-directional communication for wireless devices within their coverage.

WLAN systems 140 and 150 can respectively implement radio technologies such as IEEE 802.11 (Wi-Fi), Hiperlan, etc. WLAN system 140 can include one or more access points 142 that can support bi-directional communication. Similarly, WLAN system 150 can include one or more access points 152 that can support bi-directional communication. WPAN system 160 can implement a radio technology such as IEEE 802.15.1 (Bluetooth), IEEE 802.15.4 (Zigbee), etc. Further, WPAN system 160 can support bi-directional communication for various devices such as wireless device 110, a headset 162, a computer 164, a mouse 166, or the like.

Broadcast system 170 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, broadcast system 170 can include one or more broadcast stations 172 that can support one-way communication.

Satellite positioning system 180 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, satellite positioning system 180 can include a number of satellites 182 that transmit signals used for position determination.

In an aspect, wireless device 110 can be stationary or mobile and can also be referred to as a user equipment (UE), a mobile station, a mobile equipment, a terminal, an access terminal, a subscriber unit, a station, etc. Wireless device 110 can be a cellular phone, a personal digital assistant (PDA), a wireless modem, a handheld device, a laptop computer, a cordless phone, a wireless local loop (WLL) station, etc. In addition, wireless device 110 can engage in two-way communication with cellular system 120 and/or 130, WLAN system 140 and/or 150, devices within WPAN system 160, and/or any other suitable system(s) and/or device(s). Wireless device 110 can additionally or alternatively receive signals from broadcast system 170 and/or satellite positioning system 180. In general, it can be appreciated that wireless device 110 can communicate with any number of systems at any given moment.

Figure 2:
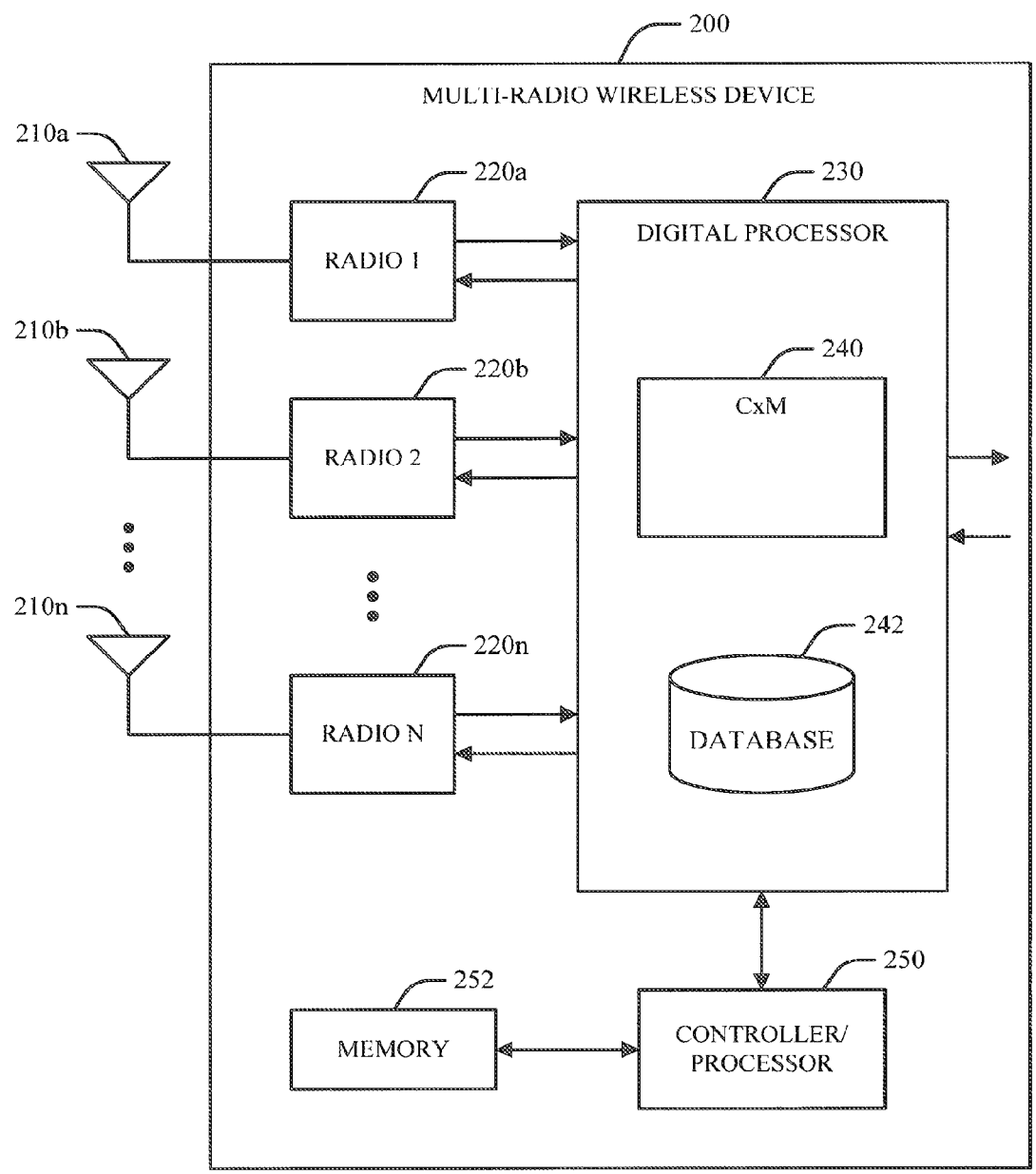
FIG. 2 is a block diagram of an example wireless device that can be operable to manage coexistence between respective radios in an associated wireless communication system in accordance with various aspects.

Turning next to FIG. 2, a block diagram is provided that illustrates an example design for a multi-radio wireless device 200. As FIG. 2 illustrates, wireless device 200 can include N radios 220a through 220n, which can be coupled to N antennas 210a through 210n, respectively, where N can be any integer value. It should be appreciated, however, that respective radios 220 can be coupled to any number of antennas 210 and that multiple radios 220 can also share a given antenna 210.

In general, a radio 220 can be a unit that radiates or emits energy in an electromagnetic spectrum, receives energy in an electromagnetic spectrum, or generates energy that propagates via conductive means. By way of example, a radio 220 can be a unit that transmits a signal to a system or a device or a unit that receives signals from a system or device. Accordingly, it can be appreciated that a radio 220 can be utilized to support wireless communication. In another example, a radio 220 can also be a unit (e.g., a screen on a computer, a circuit board, etc.) that emits noise, which can impact the performance of other radios. Accordingly, it can be further appreciated that a radio 220 can also be a unit that emits noise and interference without supporting wireless communication.

In accordance with one aspect, respective radios 220 can support communication with one or more systems. Multiple radios 220 can additionally or alternatively be used for a given system, e.g., to transmit or receive on different frequency bands (e.g., cellular and PCS bands).

In accordance with another aspect, a digital processor 230 can be coupled to radios 220a through 220n and can perform various functions, such as processing for data being transmitted or received via radios 220. The processing for each radio 220 can be dependent on the radio technology supported by that radio and can include encryption, encoding, modulation, etc., for a transmitter; demodulation, decoding, decryption, etc., for a receiver, or the like. In one example, digital processor 230 can include a coexistence manager (CxM) 240 that can control the operation of radios 220 in order to improve the performance of wireless device 200 as generally described herein.

For simplicity, digital processor 230 is shown in FIG. 2 as a single processor. However, it should be appreciated that digital processor 230 can comprise any number of processors, controllers, memories, etc. In one example, a controller/processor 250 can direct the operation of various units within wireless device 200. Additionally or alternatively, a memory 252 can be used to store program codes and data for wireless device 200. Digital processor 230, controller/processor 250, and memory 252 can be implemented on one or more integrated circuits (ICs), application specific integrated circuits (ASICs), etc. By way of specific, non-limiting example, digital processor 230 can be implemented on a Mobile Station Modem (MSM) ASIC.

In accordance with one aspect, respective radios 220 can impact and/or be impacted by respective other radios 220 through various mechanisms (e.g., radiative, conductive, and/or other interference mechanisms). In some cases, such interference can render some event combinations impossible or otherwise impractical to occur across different radios simultaneously. Accordingly, it can be appreciated that a substantially optimal decision on a given radio 220 (e.g., a decision regarding whether to provide a negative acknowledgement (NACK) or reduced transmit power for a WLAN transmitter radio, etc.) can in some cases depend on the status of respective other associated radios 220. Accordingly, CxM 240 can handle management of radios in the presence of potential conflicts without requiring piece-wise solutions for each pair of mechanisms.

Figure 3:
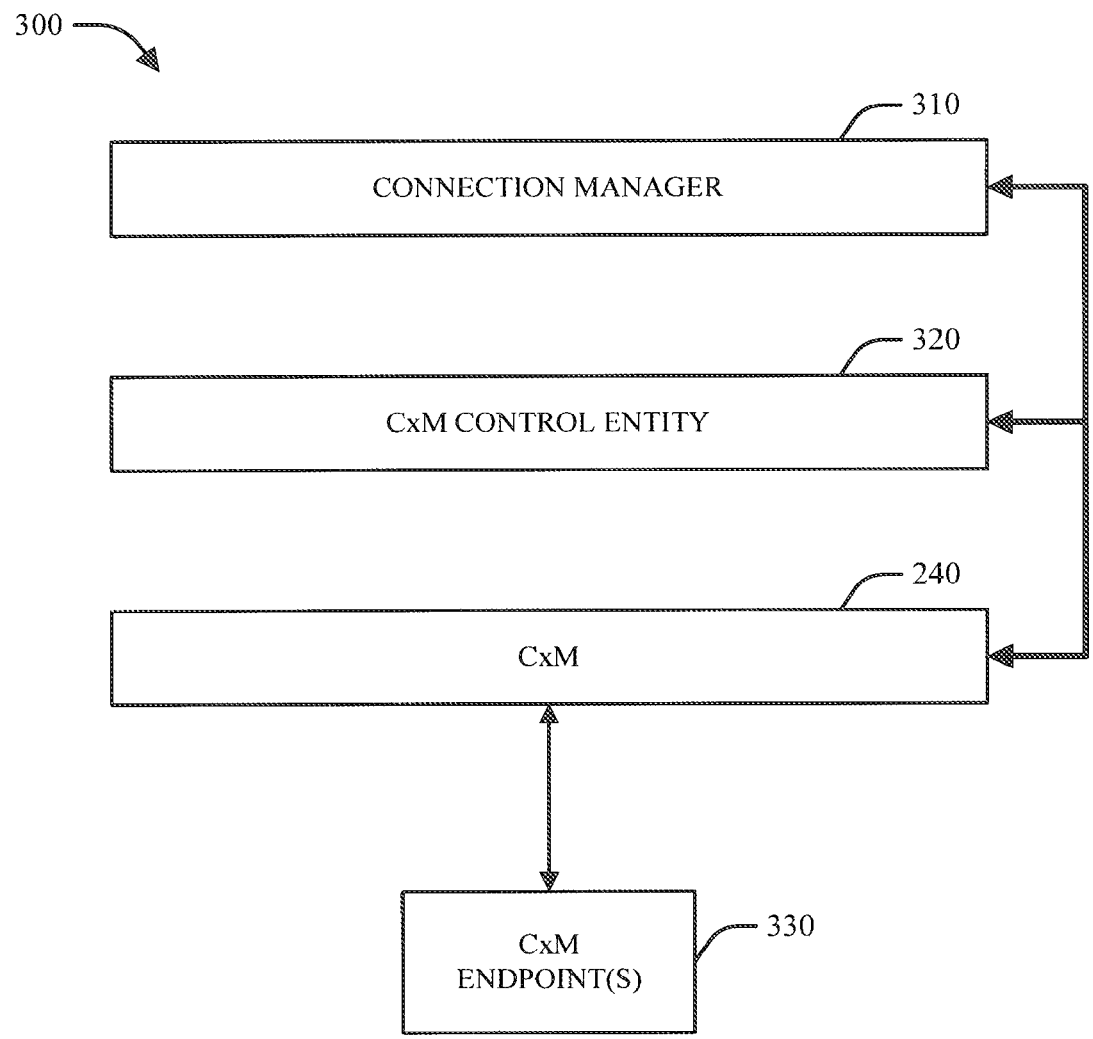
FIG. 3 is a block diagram of an example multi-radio coexistence management system that can be operable to implement various aspects described herein.

Turning next to FIG. 3, a block diagram of an example system 300 for multi-radio coexistence management that can be operable to implement various aspects described herein is illustrated. As shown in FIG. 3, system 300 can include a CxM 240, which can manage respective CxM endpoints 330 (e.g., radios 220, antennas, power amplifiers (PAs), filters, mixers, modems, etc.) as generally described herein. In accordance with one aspect, CxM 240 can be coupled to and/or otherwise leverage the functionality of a connection manager (CnM) 310, a CxM control entity 320, and/or other suitable components. In accordance with one aspect, CxM 240, together with CnM 310 and CxM control entity 320, can operate collectively as a radio frequency (RF) coexistence platform for one or more CxM endpoints 330.

In one example, CnM 310 can facilitate connectivity of respective CxM endpoints 330 based on information obtained from CxM 240. For example, CnM 310 can be utilized to assign an optimal set of resources for optimal concurrent use by applications associated with respective CxM endpoints 330. In another example, CxM control entity 320 can be any suitable integrated circuit, subsystem, or combination thereof (e.g., one or more processors, state machines, etc.) operable to configure operation of CxM 240 and/or respective buses managed and/or otherwise operated by CxM 240 as generally described herein. Additionally or alternatively, CxM control entity 320 can act as a peripheral subsystem, thereby improving peripheral throughput and system concurrency associated with system 300, by decoupling peripheral operations from a main host processor or the like and/or by performing other suitable actions.

In accordance with another aspect, system 300 and the components illustrated therein can act independently and/or with the aid of any other suitable module(s) to implement various aspects of the functionality described herein, and/or any other suitable functionality, in the context of any appropriate application(s), operating mode(s), or the like. However, it should be appreciated that the implementations illustrated and described herein are intended merely as non-limiting example multi-radio coexistence implementations and that, unless explicitly stated otherwise, the claimed subject matter is not intended to be limited to any specific implementation(s).

Figure 4:
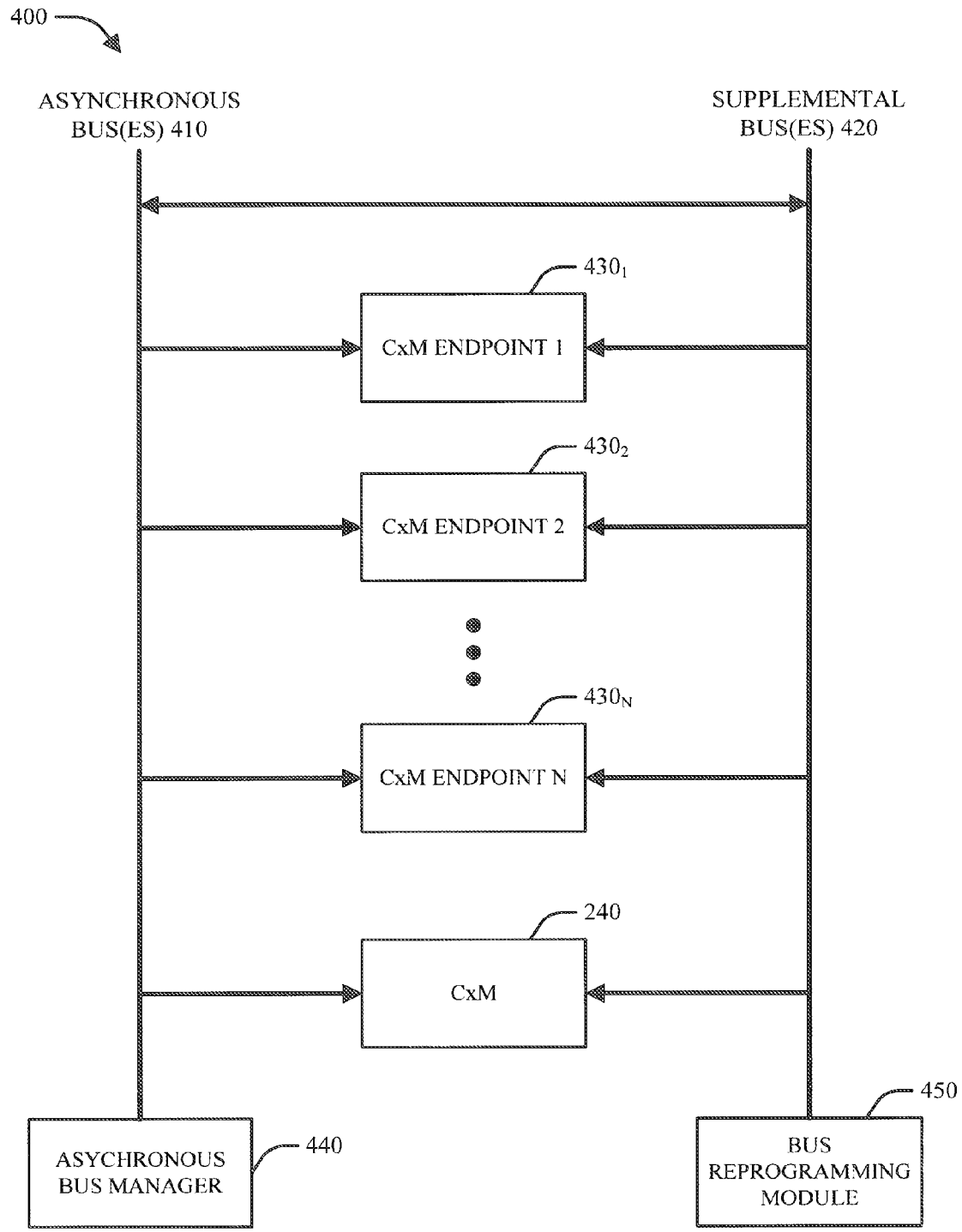
FIG. 4 is a block diagram of a system that facilitates management of an asynchronous bus interface between a multi-radio coexistence manager (CxM) and respective CxM-managed endpoints in accordance with various aspects.

Turning next to FIG. 4, a system 400 that facilitates management of an asynchronous bus interface between a multi-radio CxM 240 and respective CxM-managed endpoints 430 is illustrated. As shown in FIG. 4, a CxM 240 can be provided for a set of CxM-managed endpoints 430 (e.g., radios, antennas, PAs, filters, mixers, modems, etc.). In one example, a bus system that includes one or more asynchronous buses 410 and zero or more supplemental buses 420 can be utilized within system 400 to communicatively connect respective CxM endpoints 430 and/or other suitable managed endpoints to a multi-radio coexistence platform that includes CxM 240.

In accordance with one aspect, respective asynchronous buses 410 in system 400 can operate according to an asynchronous protocol (e.g., as controlled by an asynchronous bus manager 440 and/or other suitable means), thereby facilitating an asynchronous interface design for multi-radio coexistence management. In one example, such a design can facilitate coordination and allocation system resources that encompass a solution space including, for example, RF/Antenna, Baseband, Protocol, and/or other suitable elements.

In accordance with another aspect, it can be appreciated that communication systems with multiple radios in a close environment can create substantial operational issues. Such issues can present, for example, under conditions of concurrency (e.g., wherein multiple radios operate simultaneously), as radio coexistence issues can arise in such conditions that can, in turn, result in poor user experience. Further, it can be appreciated that the problem of communication between multiple radios operating on a given common platform can be difficult due to the heterogeneity of respective radio technologies (e.g., based on factors such as physical interfaces, protocol stack, operating system, or the like).

Conventionally, individualized solutions such as packet traffic arbitration (PTA) for Bluetooth (BT) and Wireless Local Area Network (WLAN) technologies are employed to facilitate radio coexistence. However, it can be appreciated that such conventional solutions are piecewise in nature and, as such, do not cover multiple radios. Further, it can be appreciated that existing multi-radio management techniques utilize proprietary and diverse interfaces, which as a result require greater pin counts, higher power and area, higher overall complexity, and the like. In addition, as existing interfaces for such conventional techniques operate in a synchronous fashion, such interfaces are not able to obtain or leverage knowledge of latency. Thus, in accordance with various aspects described herein, CxM 240 and system 400 can be utilized to provide a uniform, universal, and easily extendable multi-radio coexistence solution, in combination with an asynchronous bus interface that can be utilized to mitigate at least the above shortcomings of conventional solutions.

As illustrated by system 400, one or more buses operating according to an asynchronous protocol (e.g., asynchronous bus(es) 410) can be utilized to facilitate communication between CxM 240 and respective managed endpoints of CxM 240, such as CxM endpoints 430. In one example, CxM endpoints can correspond to various components of any suitable radio access technology (RAT). Examples of RATs that can correspond to CxM endpoints 430 include, but are not limited to, 3GPP LTE, Forward Link Only (FLO), BT, WLAN, UMTS, or the like.

As further shown in FIG. 4, one or more elements of system 400, such as CxM 240, CxM endpoint(s) 430, asynchronous bus(es) 410, or the like, can be coupled to and further leverage one or more supplemental buses 420 for communication within system 400. In one example, supplemental bus(es) 420 in system 400 can operate according to any suitable bus protocol, such as a synchronous protocol, an asynchronous protocol, and/or any other suitable protocol or combination of suitable protocols. In another example, one or more supplemental buses 420 can be reprogrammable for operation according to a plurality of operating modes, such as a synchronous mode, an asynchronous mode, and/or any other suitable mode(s). To these ends, one or more supplemental bus(es) 420 can be associated with a bus reprogramming module 450 and/or appropriate modules. While not shown in system 400, one or more asynchronous buses 410 can in some cases additionally or alternatively be capable of reprogramming for operation according to a non-asynchronous protocol for a definite or indefinite period of time (e.g., for at least one decision unit in time and/or any other suitable time interval).

Figure 5:
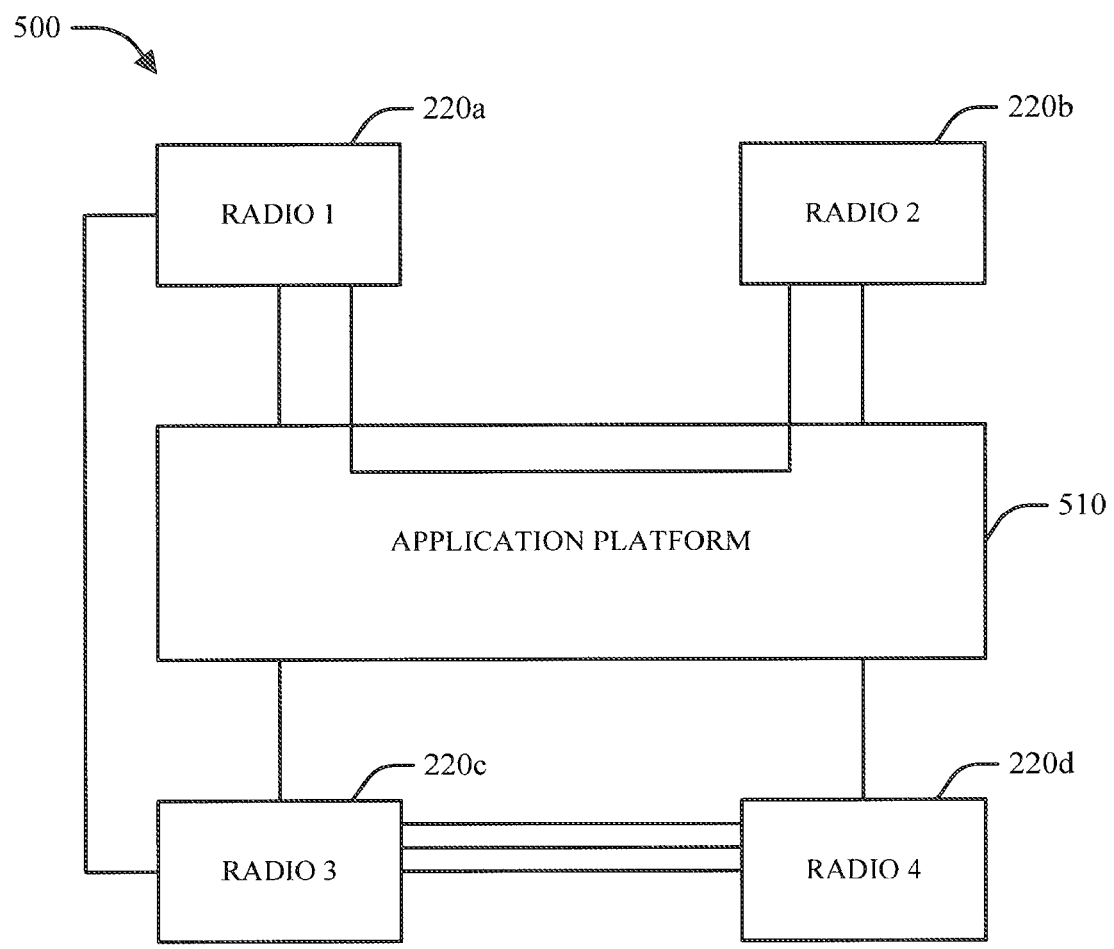
FIG. 5 is a block diagram that illustrates a multi-radio coexistence solution that can be utilized for management of respective endpoints.

As noted above, it can be appreciated that an increasing number of radios in different configurations and technologies are being connected to portable devices, platforms, system-on-a-chip (SOC) implementations, and the like, in different configurations and technologies. Existing platforms can be utilized to provide coexistence between two interfering frequency bands by, for example, using specific proprietary bus structures and/or software. An example of this is illustrated by system 500 in FIG. 5, wherein respective proprietary buses are utilized to coordinate between respective pairs of radios 220 and/or other radio technology-related endpoints associated with an application platform 510. As illustrated herein, application platform 510 can include one or more internal or external application processors and/or other suitable means for handling applications associated with radios 220 and/or other endpoints associated with application platform 510.

However, as the number of technologies utilized by devices increases, more and different communication stacks have to coexist, each requiring special attention in the SOC to do no ultimate harm to the system and its related user experience. Accordingly, it can be appreciated that improved high-level operating system (HLOS), application platform, and modem developments are inhibited without dedicated solutions for an overall combination of radios and/or other endpoints connected to a given platform. Thus, system 400 and CxM 240 as described above can operate to provide manageability and coexistence of different radios and/or other endpoints in real time and without extra burden on existing interfaces, software, HLOS, and the like. Further, the various aspects provided herein facilitate a complete, flexible, and scalable solution for multi-radio coexistence without requiring significant re-invention of bus structures or protocol schemes.

Figure 6:
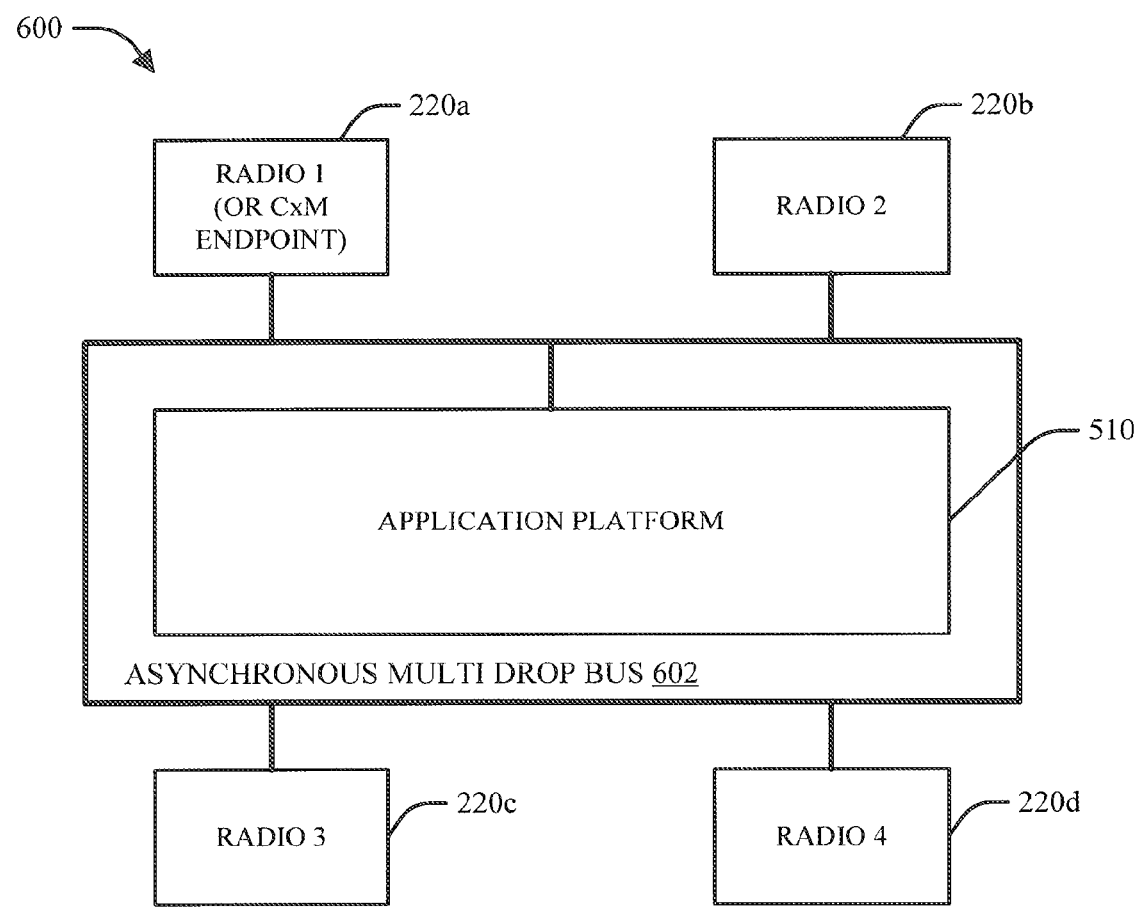
FIGS. 6-7 are block diagrams that illustrate respective improved multi-radio coexistence solutions that leverage respective asynchronous buses and/or bus interfaces in accordance with various aspects.

Thus, in contrast to the piecewise coexistence solution shown in system 500, an asynchronous bus structure as illustrated by system 600 in FIG. 6 can be utilized by a CxM and/or another suitable management entity to connect distinct communication devices (e.g., radios, filters, PAs, etc.) of different radio technologies in a simplified manner. For example, an asynchronous multi drop bus 602 and/or another suitable bus structure can be utilized for substantially all radios 220 and/or other radio technology-based endpoints associated with a given application platform 510 without requiring proprietary piecewise coexistence implementations. Accordingly, as shown in system 600, an asynchronous bus and its corresponding protocol can be made independent and agnostic from existing modem-level, radio-level, or other lower level software and/or hardware implementations.

Figure 7:
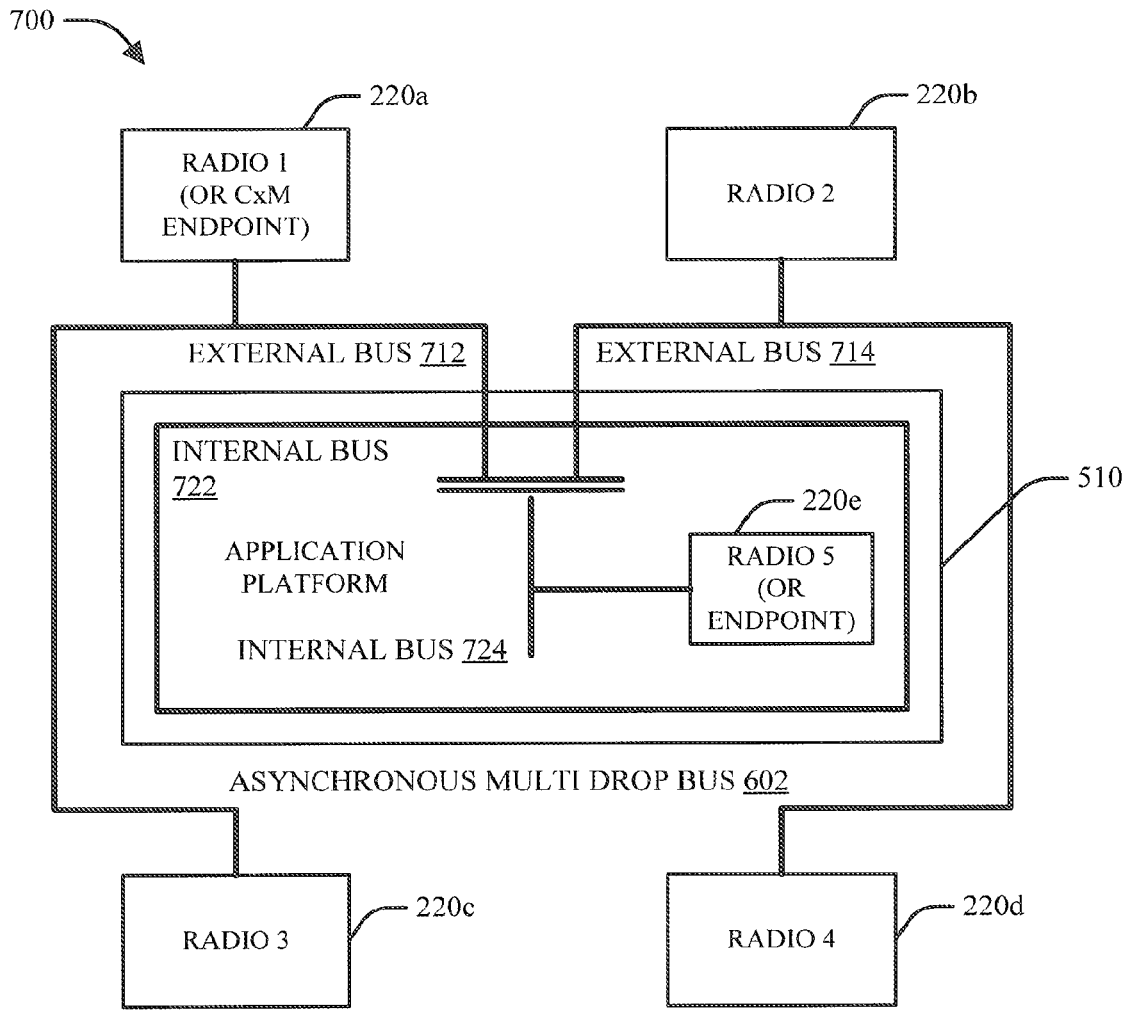

As illustrated by FIG. 6, a single bus, such as an asynchronous multi drop bus 602 or the like, can be utilized to provide universal connectivity between a set of radios 220 and/or other endpoints and an application platform 510. Alternatively, as shown in system 700 in FIG. 7, functionality of an asynchronous multi drop bus 602 or the like can be realized by way of one or more external buses 712-714 in combination with one or more internal buses 724 located within application platform 510 and/or other integrated circuits and/or SOCs implemented within system 700. For example, as shown in FIG. 7, application platform 510 and/or another suitable integrated circuit can have implemented thereon one or more internal buses 722-724 and at least one managed endpoint (e.g., a radio 220 and/or another suitable endpoint). Accordingly, a bus system can be maintained that communicatively connects application platform 510 and/or another suitable integrated circuit and respective additional portions of a multi-radio coexistence platform such that respective managed endpoints implemented on the integrated circuit are coupled to the bus system via the one or more internal buses implemented on the integrated circuit.

Thus, as shown by systems 600 and 700, it can be appreciated that an asynchronous bus system can be implemented and maintained in order to mitigate the shortcomings of traditional piecewise interfaces between respective radio technologies in a multi-radio device. The bus system can be implemented as a single bus that connects substantially all endpoints, as shown in system 600, and/or as a plurality of discrete external and/or on-chip buses that collectively connect substantially all endpoints, as shown in system 700.

In accordance with one aspect, respective external buses in system 600 and/or system 700 can be implemented as a multi drop bus, which can consist of one or more wires that are connected to the same pins and/or other connection points on a given set of associated integrated circuits (e.g., associated with radios 220, other endpoints, and/or application platform 510). Additionally or alternatively, as shown in system 700, respective external buses 712-714 can interface with one or more internal buses 722-724 associated with respective integrated circuits associated with system 700. In one example, an internal bus 722 and/or 724 associated with an integrated circuit that interfaces with an external bus 712 and/or 714 can utilize a common bit width with the corresponding external bus 712 and/or 714 or a differing bit width. Further, it can be appreciated that bit widths associated with any endpoint(s) in system 600 and/or system 700 can be uniform and/or varying in any suitable manner.

With reference to systems 600 and 700, it can be appreciated that asynchronous multi drop bus 602 in system 600, as well as the collective external buses 712-714 and internal buses 722-724 in system 700, provide a unified bus structure, in contrast to previous implementations which have utilized proprietary and diverse interfaces. In one example, bus structures utilized by system 600 and/or system 700 can provide a shared multi-drop interface, thereby providing pin savings, lower power and/or lower area silicon implementations, and/or other suitable benefits. Further, as such bus systems provide an asynchronous interface, it can be appreciated that controlled latency can be provided as required by various coexistence management schemes. Further, it can be appreciated that bus structures utilized by system 600 and/or system 700 can be made OS/HLOS agnostic by virtue of operating at lower layers. Additionally or alternatively, an interface as illustrated by system 600 and/or system 700 can be made modem protocol stack agnostic within a multi-radio environment, thereby simplifying platform integration. In another aspect, a multi-radio coexistence system as illustrated by FIG. 6 and/or FIG. 7 can be implemented in software or in hardware, thereby enabling its application to different types of platforms and/or products depending on the performance and complexity desired.

In one example, implementation of the interfaces shown in FIGS. 6-7 can be achieved wholly or in part via standard bus structures and/or transport protocols, such as SLIMbus, RF front-end (RFFE) implementations, or the like, to minimize the adaptation barrier for platform implementation. Further, a common bus can be utilized to avoid scattered coexistence managers conventionally necessary for respective individual radio pairs. In addition, by providing centralized connectivity between substantially all associated radio technologies, a bus system as implemented by system 600 and/or system 700 can be operable to avoid platform incompatibility, connectivity partitioning, and/or other similar issues.

In accordance with one aspect, an asynchronous protocol as used herein can introduce real time capability (e.g., with a maximum latency on the order of 150 μs) and re-configurability on demand to conceive changes of connected devices and their policies after a period of data evaluation for respective participants. Further, an asynchronous bus and/or protocol as provided herein can be utilized to allow a broadcast mechanism to reach all connected devices on a bus simultaneously. In a further aspect as illustrated by FIGS. 6-7, a multi-drop topology can be utilized by a bus system as provided herein to provide a low pin count, a low power infrastructure, and/or other benefits.

It can be appreciated that a multi-radio coexistence interface as shown in FIG. 6 and/or FIG. 7 can be implemented in hardware, in software (e.g., as an emulation of hardware), or a combination of hardware and software. Thus, by way of non-limiting example, various structures as described herein can be implemented as a "direct hardware" implementation with zero or minimum required software involvement.

Figure 8:
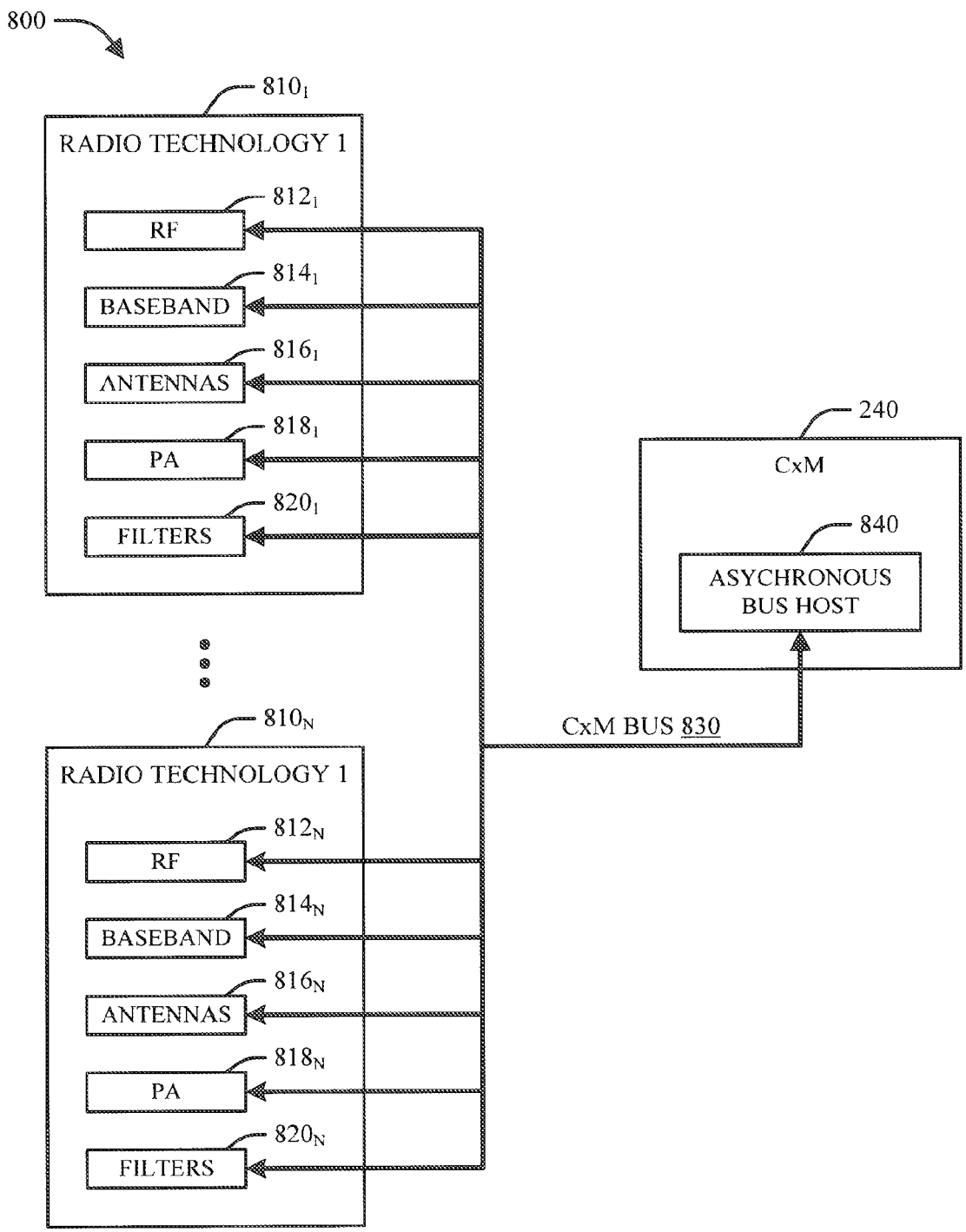
FIG. 8 is a block diagram of a system that facilitates use of an asynchronous bus for communication between a CxM and respective CxM-managed endpoints in accordance with various aspects.

Referring next to FIG. 8, a block diagram of a system 800 that facilitates use of an asynchronous bus for communication between a CxM 240 and respective CxM-managed endpoints in accordance with various aspects is illustrated. As shown in system 800, devices and/or other entities associated with respective radio technologies 810 can be coupled to a CxM 240 via a CxM bus 830. In accordance with one aspect, CxM bus 830 can be managed by an asynchronous bus host 840 and/or other suitable means, thereby facilitating an asynchronous connection between CxM 240 and connected radio technologies (e.g., via RF components 812, baseband components 814, antennas 816, PAs 818, filters 820, or the like). In one example, system 800 can utilize an interface that is extendable to any suitable number of devices and/or associated radio technologies 810. By way of specific, non-limiting example, CxM bus can support a predetermined number N of devices (e.g., 10 devices, etc.) and can be extendable to multiples xN of devices connectable to the platform by utilizing additional instances of CxM bus 830. In another specific, non-limiting example, CxM bus 830 can utilize any suitable number of pins and any suitable corresponding bit width—for example, CxM bus 830 can leverage a two-pin solution, a (2xX) pin solution, or the like.

In accordance with one aspect, CxM bus 830 can be a radio-, modem-, and/or coexistence requirement-agnostic asynchronous bus, which can be centralized in any suitable application processor or control unit associated with a mobile platform. Further, CxM bus 830 can be utilized as a hardware replacement for software coexistence management in some cases (e.g., if no real time capability is required).

In accordance with another aspect, CxM bus 830 can utilize a multi-drop structure and/or any other suitable structure for connecting substantially all existing radios, antennas, PAs, filters/mixers, or the like associated with radio technologies 810 with an asynchronous protocol. Accordingly, CxM bus 830 can be utilized as a common, flexible, robust, and cost-effective design to interface substantially all possible combinations of radios, antennas, PAs, filters/mixers, etc., of any suitable radio technology 810 or combination thereof (e.g., point to point (P2P), Circuit Switch, internet protocol (IP), etc.). In one example, CxM bus 830 and respective connected devices or modules can be controlled by a central CxM host to enable seamless (e.g., no loss of data) coexistence management, re-configurability of coexistence policies, on-demand priority adaptation, or the like, as well as keeping full compliance to an asynchronous bus architecture.

In accordance with a further aspect, system 800 can mitigate conventional problems experienced by portable devices in managing coexistence of different radios, networks, and protocol stack technologies via a configurable, power-aware bus architecture and its asynchronous protocol. Additionally or alternatively, various mechanisms as described herein can mitigate conventional problems associated with radio synchronization.

In one example, a CxM mechanism as shown in system 800 can utilize a hardware bus structure and/or mimic the structure as a pure software solution by, for example, loosening hard real time requirements/requests. For example, as generally described above, the structure and/or implementation of CxM bus 830 can vary outside and/or within various integrated circuits, SOCs, and/or other components that comprise system 800. In particular, an external bus utilized to connect respective integrated circuits in system 800 can be configured to interface with internal bus structures on respective integrated circuits such as an advanced extensible interface (AXI) bus, an advanced high-performance bus (AHB), or the like, thereby facilitating the use of buses having differing and potentially higher bit widths within respective integrated circuits. Additionally or alternatively, external buses utilized to interface with respective integrated circuits can be scalable to varying degrees within system 800. In a further example, a bus structure as illustrated by system 800 and/or other bus structures as described herein can allow coexistence management with full QoS, minimum latency, low pin count (e.g., 2 pins), and/or other benefits.

By way of specific example, various solutions can be implemented for asynchronous decision unit (DU) transport to respective devices connected to CxM bus 830. These solutions can include, for example, two chronological transports and/or one P2P for host to radio communication and a second P2P for broadcast (e.g., host to all radios) emulation. By way of further non-limiting example, CxM bus 830 can be implemented at least in part via an existing Mobile Industry Processor Interface (MIPI)-based standard SLIMbus structure and/or any other suitable structure. For example, a 2-pin SLIMbus structure can be utilized to implement at least a portion of CxM bus 830 according to one or more predefined and/or proprietary asynchronous SLIMbus protocols. Alternatively, other existing bus structures, such as RF front end (RFFE) implementations, could be utilized.

Figure 9:
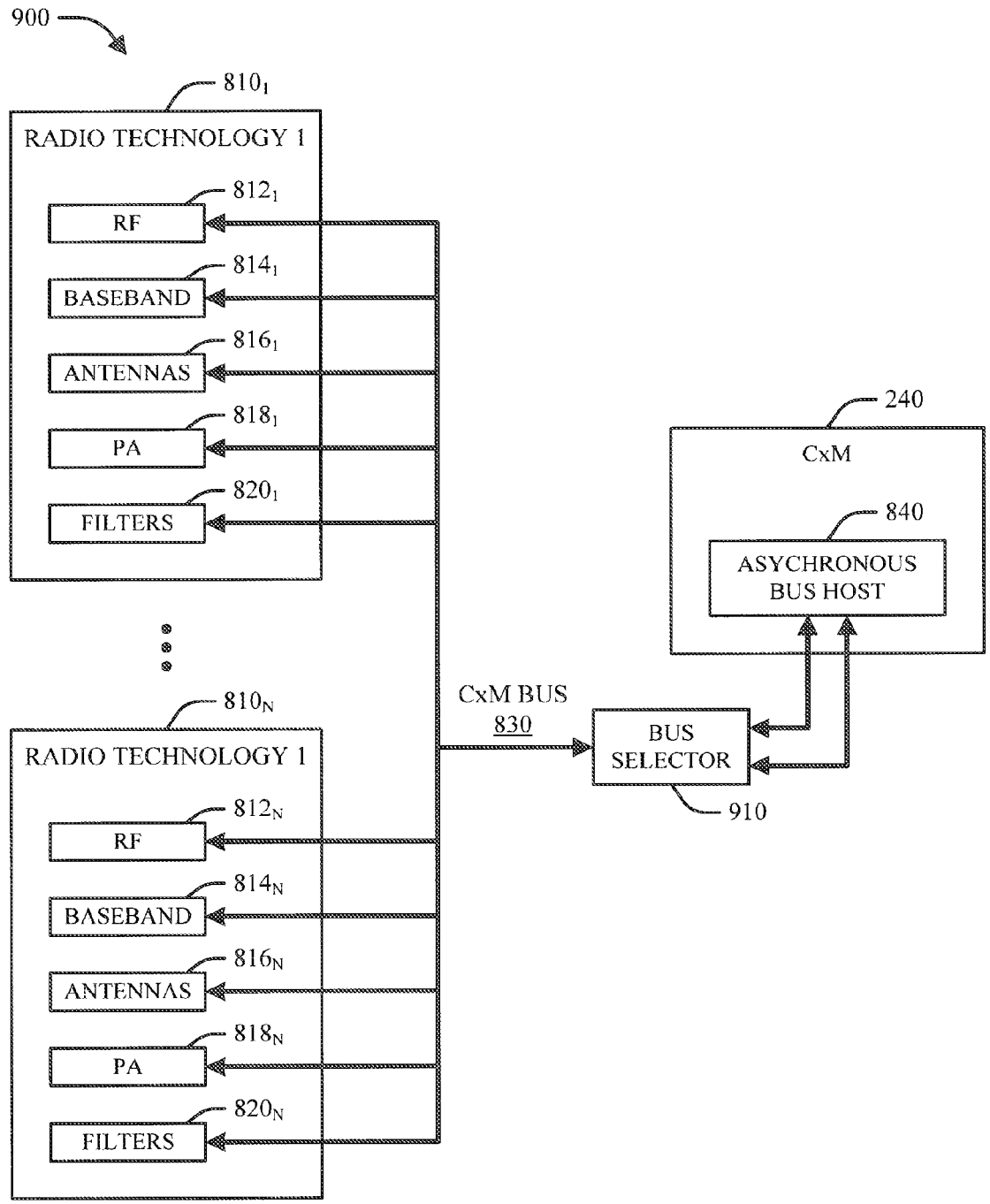
FIG. 9 is a block diagram of a system that facilitates use of multiple asynchronous buses for communication between a CxM and respective CxM-managed endpoints in accordance with various aspects.

Turning to FIG. 9, a block diagram of a system 900 is provided that illustrates an alternate implementation of CxM bus 830. As system 900 illustrates, CxM 240 can be configured to leverage multiple asynchronous buses, each of which can be utilized by a subset of radio technologies 810 associated with CxM 240. In one example, a bus selector 910 and/or other means can be utilized to facilitate connection of appropriate CxM buses 830 to respective endpoints. By way of specific example, bus selector 910 can effectively join a first bus operating in an asynchronous manner and a second bus operating in an asynchronous manner such that CxM 240 is coupled to the first bus and the second bus and at least one managed endpoint associated with radio technologies 810 is coupled to a common CxM bus 830 that implements functionality of the first bus and the second bus. Based on such joining, bus selector 910 can switch the common CxM bus 830 between functionality of the first bus and the second bus in response to a desired mode of communication between the at least one managed endpoint associated with radio technologies 810 and CxM 240.

While system 900 illustrates that bus selector 910 performs selections to facilitate coupling of multiple buses associated with CxM 240 to a single common CxM bus 830 associated with radio technologies 810, it should be appreciated that any suitable selection(s) could be performed. For example, radio technologies 810 can be associated with multiple buses in addition to, or instead of, CxM 240. Additionally or alternatively, multiple bus selectors 910 and/or other means can be implemented to facilitate implementation of different buses to different endpoints.

Figure 10:
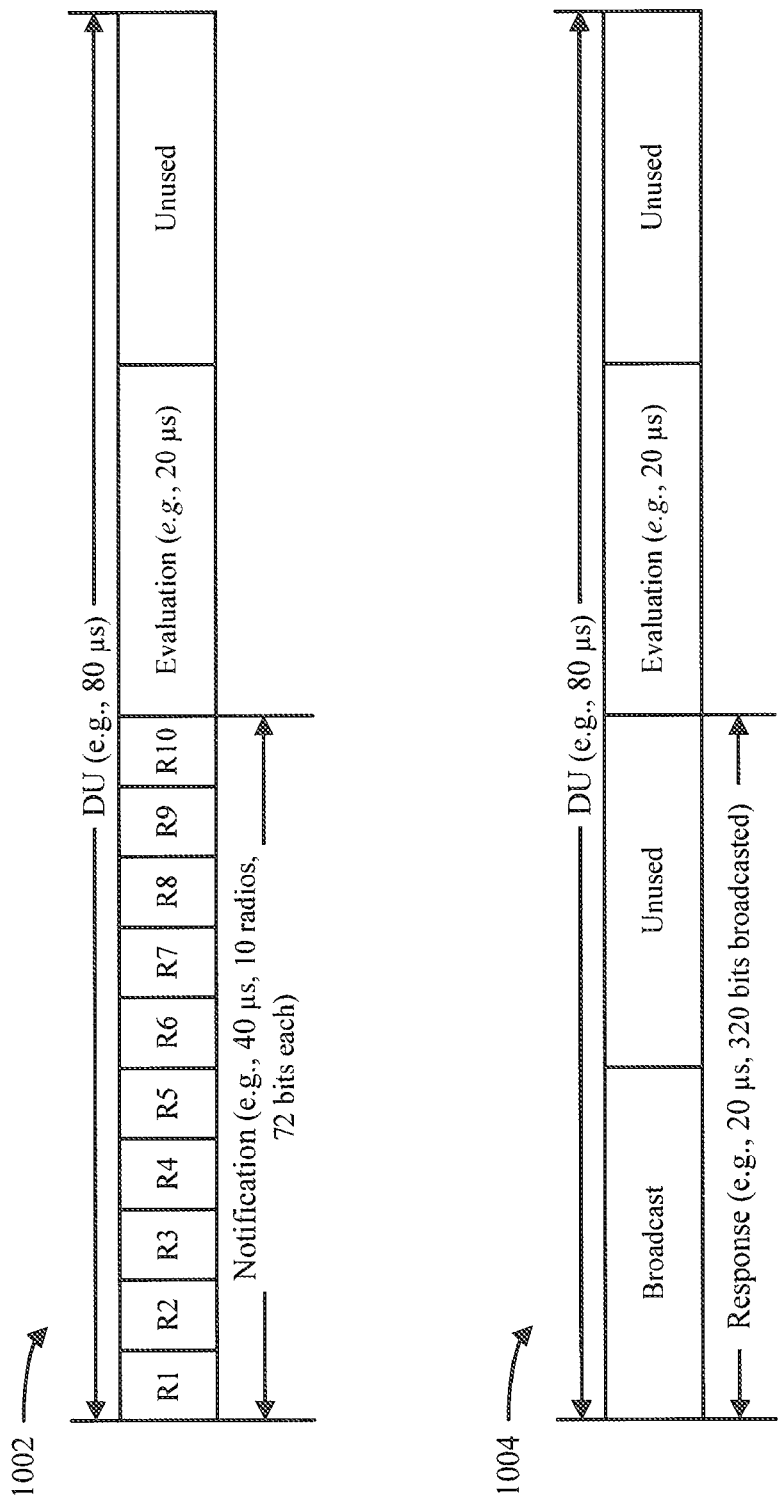
FIG. 10 illustrates operation of one or more example asynchronous CxM buses in time in accordance with various aspects.

Turning next to FIG. 10, respective diagrams 1002-1004 are provided that illustrate operation of one or more example asynchronous CxM buses in time in accordance with various aspects. In one example, a CxM and/or related radios can operate according to a timeline divided into DUs in time, which can be any suitable uniform or non-uniform length (e.g., 80 μs). By way of specific example, a DU can be divided into respective phases, such as a notification phase (e.g., 40 μs) where various radios send notifications of imminent events, an evaluation phase (e.g., 20 μs) where notifications are processed, or the like. It should be appreciated, however, that diagrams 1002-1004 are provided for illustration and that various multi-radio coexistence implementations as described herein can utilize any suitable timing scheme.

In accordance with one aspect, diagrams 1002-1004 illustrate respective mechanisms for minimum connection capability of multiple (e.g., 10) endpoints. It should be appreciated, however, that the mechanisms illustrated by diagrams 1002-1004 are not intended to be limited to a given number of endpoints. Initially, a programmable message can be utilized for data and/or control signaling, which can utilize a data structure such as that shown in diagram 1002. By way of specific, non-limiting example corresponding to diagram 1002, a maximum P2P (e.g., Notification Period) data bit width can be 72 bits and a maximum P2P (e.g., Notification Period for each connected device) for each device can be between 4 and 5 μs. Subsequently, after reconfiguration of the bus, a broadcast transmission can be selected, which can be performed in accordance with the data structure shown in diagram 1004. By way of specific, non-limiting example, a maximum broadcast (e.g., Response) data bit width can be 320 bits, a maximum broadcast (e.g., Response Period) data period associated with each DU can be 20 μs, a maximum CxM evaluation period for each DU can be 20 μs, and a maximum latency can be 150 μs.

In accordance with another aspect, asynchronous buses for multi-radio coexistence implemented as described herein can be utilized to expedite communication of notifications and responses as shown in diagrams 1002-1004. For example, in contrast to utilizing pre-defined notification, evaluation, and response phases in time corresponding to respective DUs, notifications and responses can be communicated at common time intervals, thereby enabling at least a portion of respective DUs in time to be unused and/or used to support management of additional devices and their associated notifications and/or responses.

In one example, a multi-radio CxM and respective associated devices can be associated with two or more asynchronous CxM buses such that the timelines corresponding to diagram 1002 and diagram 1004 can be executed by respective buses in a concurrent manner. For example, a first bus operating in an asynchronous manner can be maintained to communicatively connect at least one managed endpoint to an associated multi-radio coexistence platform and collect notifications for the multi-radio coexistence platform from the at least one managed endpoint, and a second bus operating in an asynchronous manner can be maintained to communicatively connect at least one managed endpoint to the multi-radio coexistence platform and facilitate conveyance of coexistence commands from the multi-radio coexistence platform to the at least one managed endpoint (e.g., in a broadcast fashion). A parallel bus structure that performs in this manner can be implemented in any suitable manner, such as in hardware, software, or a combination thereof (e.g., via a hardware bus implemented in parallel with software that incorporates the functionality of a second bus).

Alternatively, some or all of the functionality illustrated by diagrams 1002-1004 could be implemented by a single asynchronous bus, such that at least one bus operating in an asynchronous manner can be maintained to communicatively connect at least one managed endpoint to an associated multi-radio coexistence platform, collect notifications for the multi-radio coexistence platform from the at least one managed endpoint, and facilitate conveyance of coexistence commands from the multi-radio coexistence platform to the at least one managed endpoint. Asynchronous single-bus functionality can be achieved by, for example, utilizing bus selection logic (e.g., bus selector 910) and/or alteration of the timelines shown in diagrams 1002-1004 (e.g., by moving at least a portion of the broadcast responses in diagram 1004 to the timeline illustrated by diagram 1002, etc.).

Figure 11:
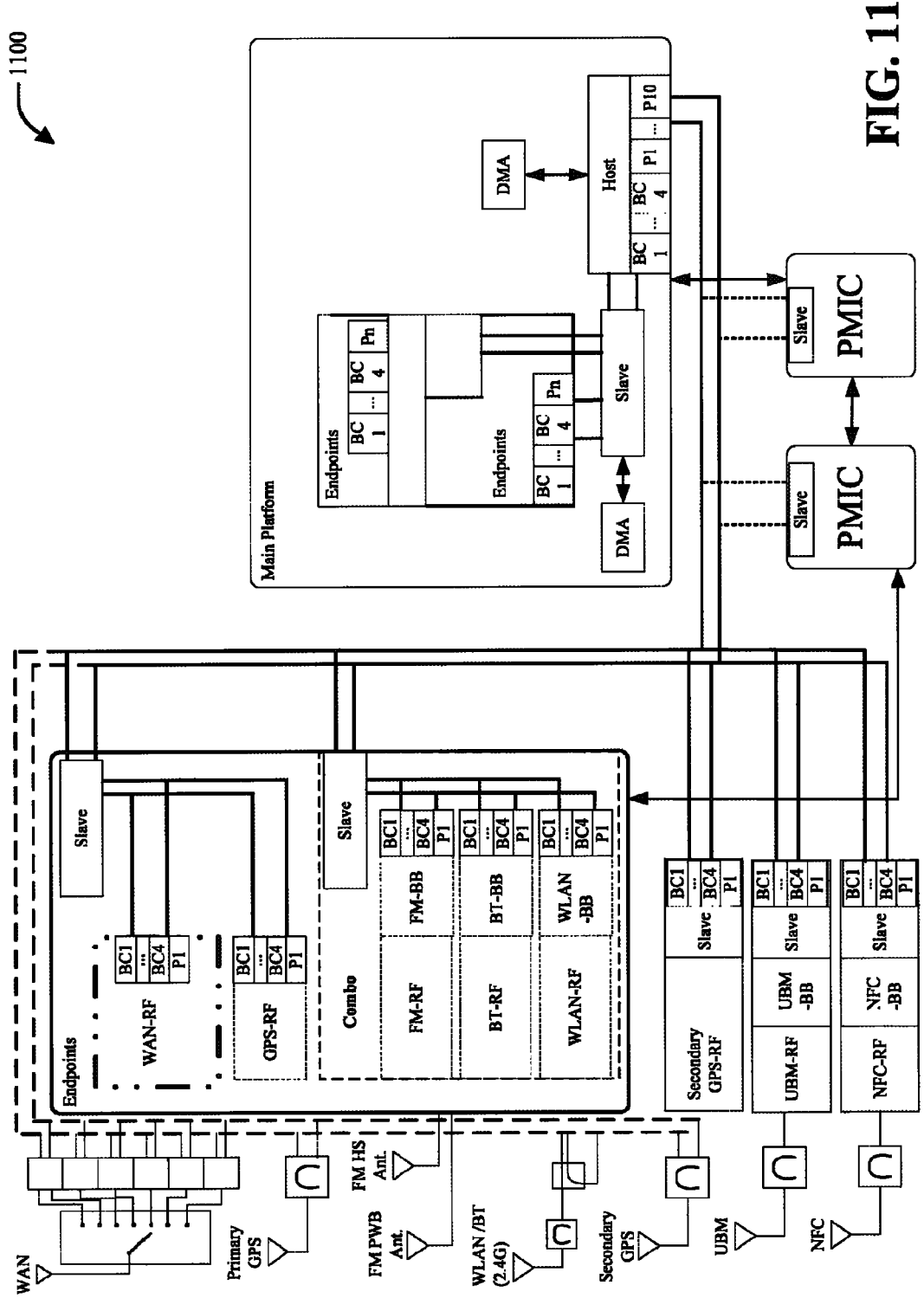
FIGS. 11-13 illustrate respective example multi-radio coexistence implementations that can leverage various aspects described herein.
Figure 12:
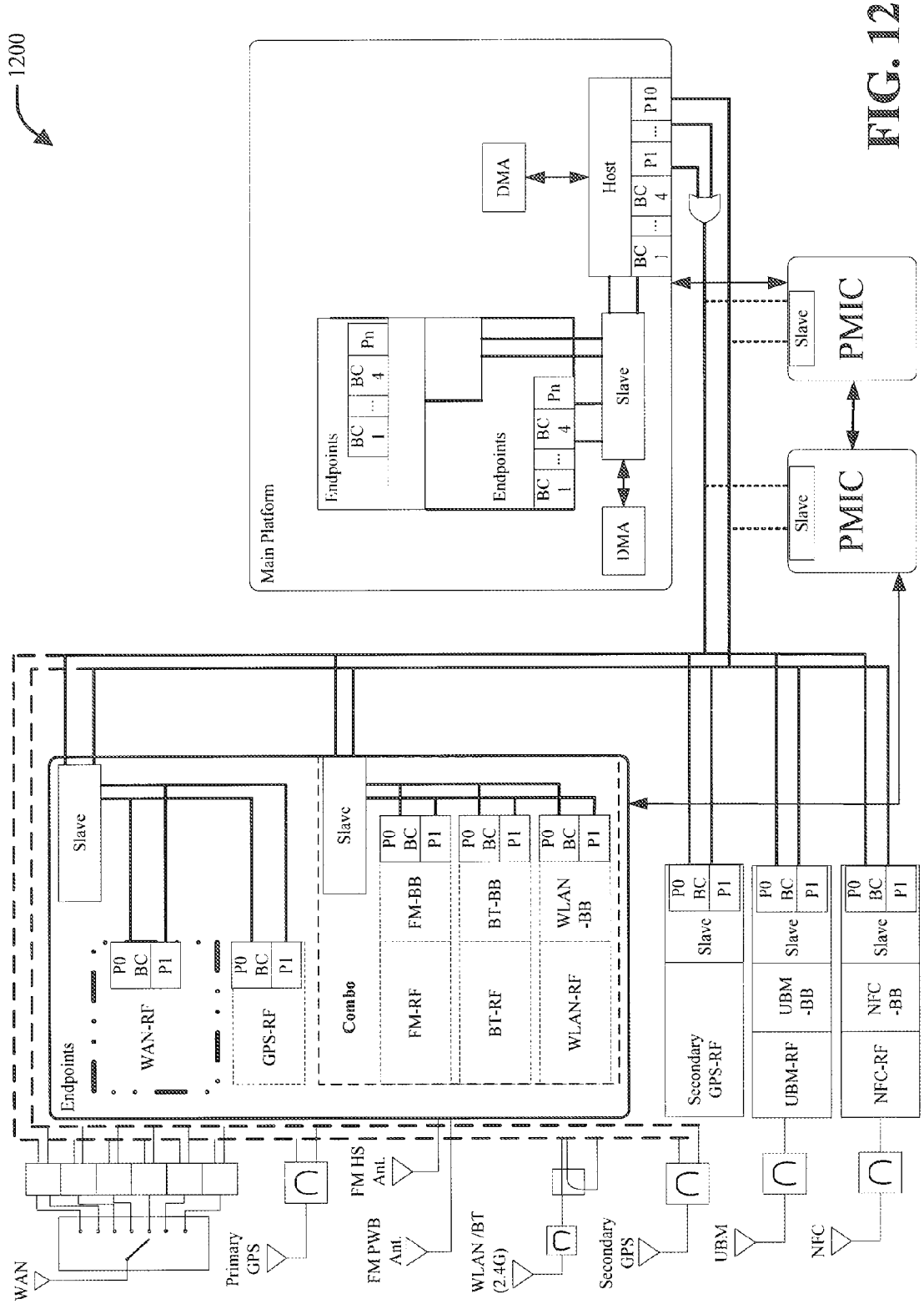
Figure 13:
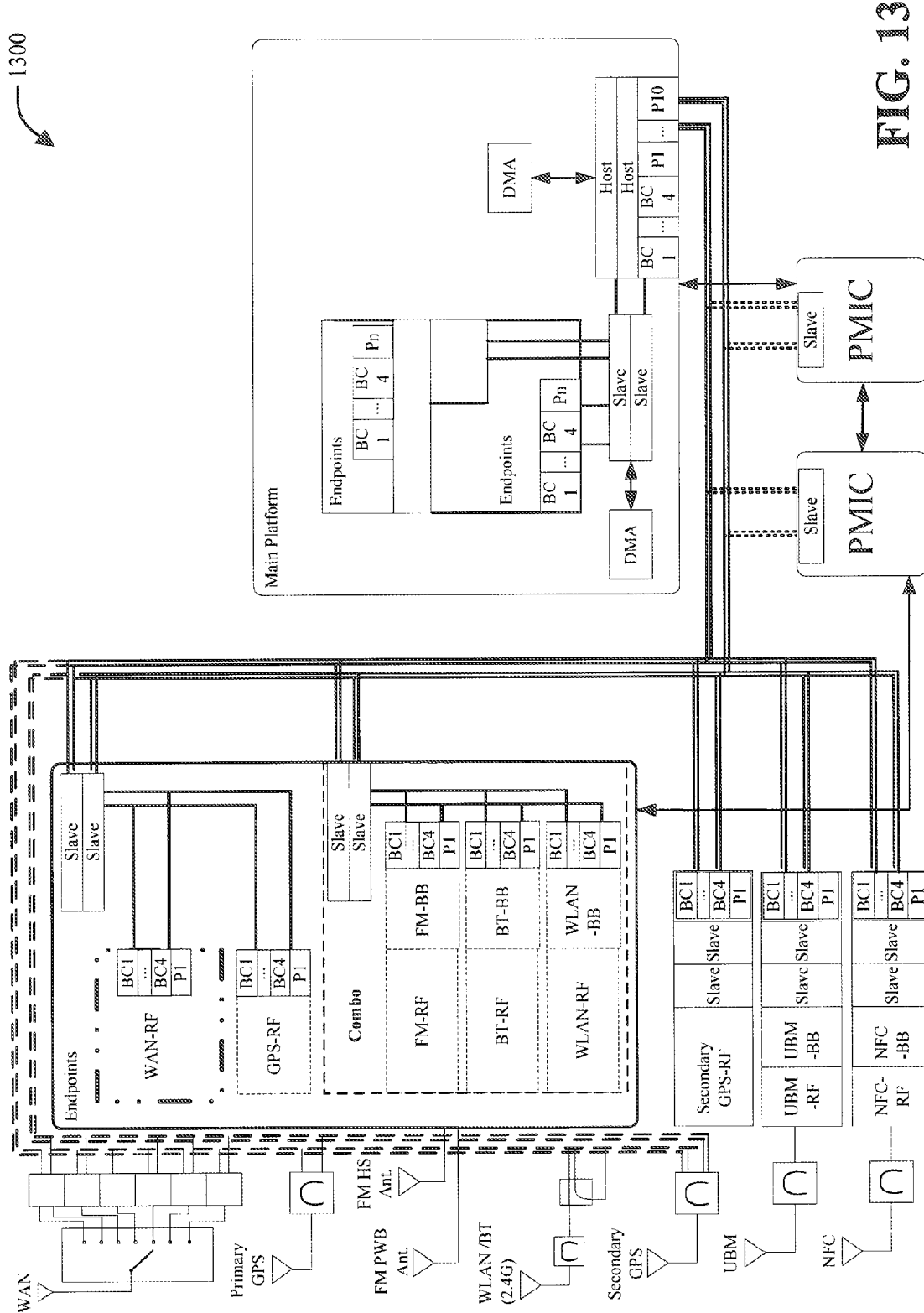

With reference now to FIGS. 11-13, respective diagrams 1100-1300 that illustrate example multi-radio coexistence implementations that can leverage various aspects described herein are provided. It should be appreciated that diagrams 1100-1300 are provided merely as examples of bus implementations that can be utilized in accordance with various aspects described herein and respective radio technologies that can be managed using such bus implementations. Further, unless explicitly stated otherwise, it is to be appreciated that the claimed subject matter is not intended to be limited to any specific implementation(s) or specific endpoint(s).

As illustrated first in diagram 1100 in FIG. 11, a 2-wire bus can be utilized to couple antennas, RF components, baseband (BB) components, and/or other endpoints associated with respective radio technologies to an application platform that provides multi-radio coexistence functionality for the respective endpoints. As further shown in diagram 1100, the application platform can provide host functionality to facilitate operation of the bus in an asynchronous manner. Further, diagram 1100 illustrates that one or more optional power management ICs (PMICs) can be coupled to the application platform and/or its managed endpoints via the bus.

Next, diagram 1200 in FIG. 12 illustrates an implementation utilizing a 2-wire bus in a similar manner to diagram 1100, wherein the application platform leverages multiple buses and/or bus wires. As shown in diagram 1200, selection logic (e.g., that performs in a similar manner to bus selector 910) can be utilized at the application platform to select an appropriate bus and/or one or more wires associated therewith to utilize for connection to respective managed endpoints at a given point in time.

Diagram 1300 in FIG. 13 illustrates a bus implementation wherein two 2-wire asynchronous buses are provided between the application platform and each of its managed endpoints. Such an implementation can be utilized, for example, to implement a parallel notification/response scheme such as that provided by diagrams 1002 and 1004 in FIG. 10.

Figure 14:
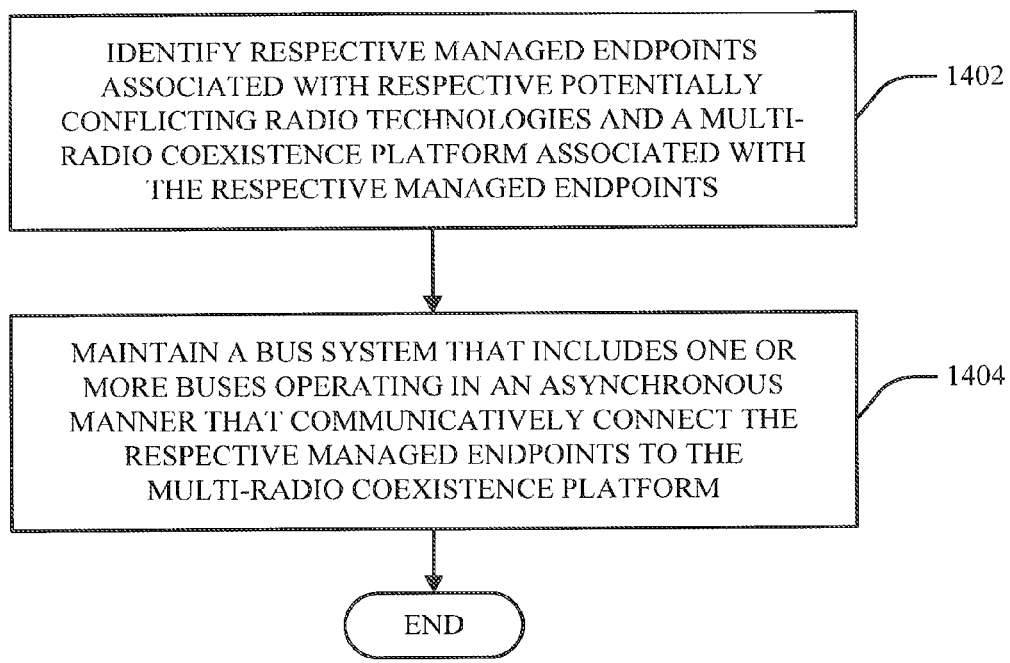
FIGS. 14-16 are flow diagrams of respective methodologies for leveraging a substantially asynchronous bus system to facilitate multi-radio coexistence for a set of managed endpoints.
Figure 15:
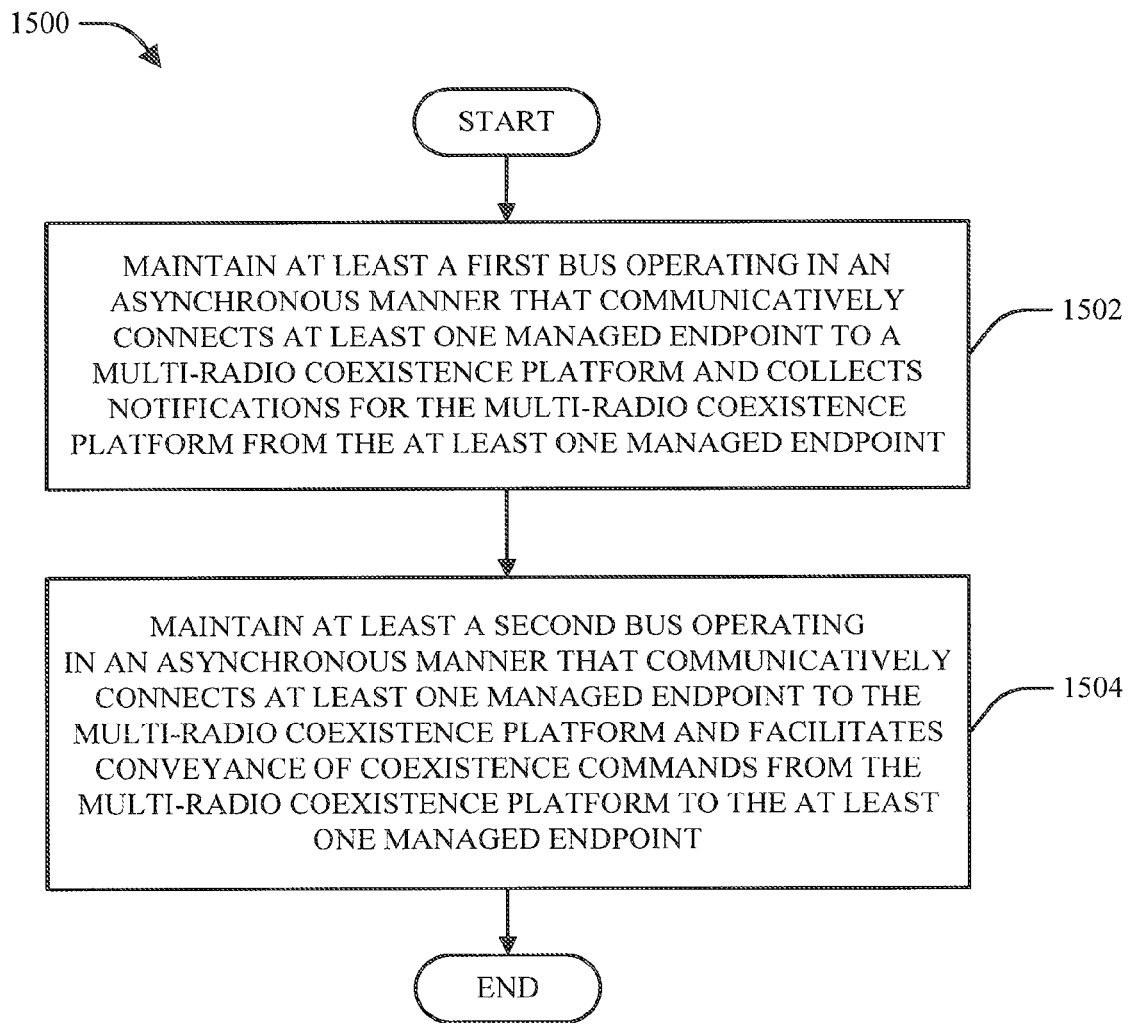
Figure 16:
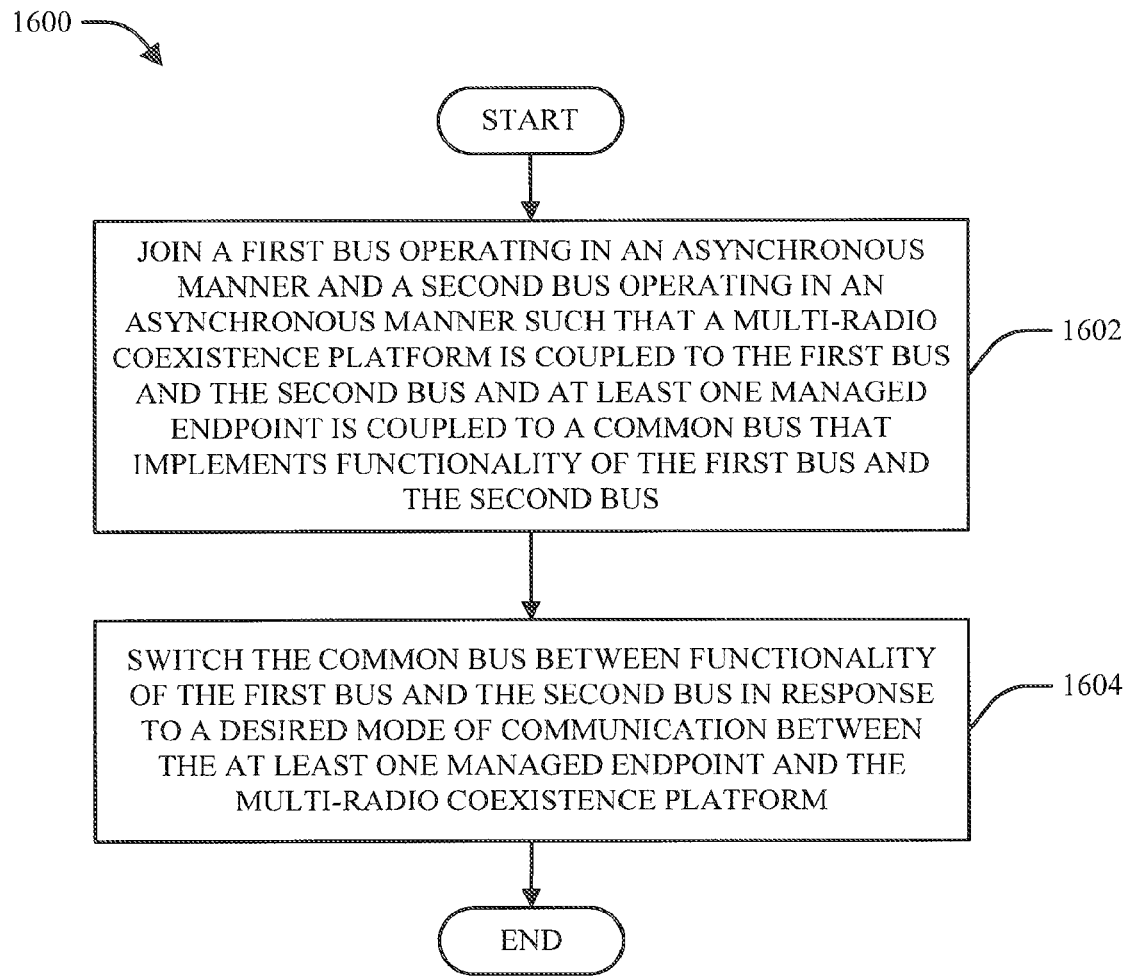

Referring now to FIGS. 14-16, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 14, illustrated is a methodology 1400 for leveraging a substantially asynchronous bus system to facilitate multi-radio coexistence for a set of managed endpoints. It is to be appreciated that methodology 1400 can be performed by, for example, a wireless device (e.g., wireless device 110 or 200, via a CxM 240) and/or any other appropriate network device. Methodology 1400 can begin at block 1402, wherein respective managed endpoints (e.g., CxM endpoints 430) associated with respective potentially conflicting radio technologies and a multi-radio coexistence platform (e.g., CxM 240) associated with the respective managed endpoints are identified. Methodology 1400 can then conclude at block 1404, wherein a bus system is maintained that includes one or more buses operating in an asynchronous manner (e.g., asynchronous bus(es) 410) that communicatively connect the respective managed endpoints to the multi-radio coexistence platform.

FIG. 15 illustrates a second methodology 1500 for leveraging a substantially asynchronous bus system to facilitate multi-radio coexistence for a set of managed endpoints. Methodology 1500 can be performed by, for example, a multi-radio device (e.g., via a CxM 240) and/or any other suitable network entity. Methodology 1500 begins at block 1502, wherein at least a first bus operating in an asynchronous manner is maintained that communicatively connects at least one managed endpoint to a multi-radio coexistence platform and collects notifications for the multi-radio coexistence platform from the at least one managed endpoint (e.g., as shown by diagram 1002). At block 1504, at least a second bus operating in an asynchronous manner is maintained that communicatively connects at least one managed endpoint to the multi-radio coexistence platform and facilitates conveyance of coexistence commands from the multi-radio coexistence platform to the at least one managed endpoint (e.g., as shown by diagram 1004).

Turning next to FIG. 16, a third methodology 1600 for leveraging a substantially asynchronous bus system to facilitate multi-radio coexistence for a set of managed endpoints is illustrated. Methodology 1600 can be performed by, for example, a multi-radio wireless device and/or any other suitable wireless network entity. Methodology 1600 can begin at block 1602, wherein a first bus operating in an asynchronous manner and a second bus operating in an asynchronous manner are joined such that a multi-radio coexistence platform is coupled to the first bus and the second bus and at least one managed endpoint is coupled to a common bus that implements functionality of the first bus and the second bus. Methodology 1600 can then conclude at block 1604, wherein the common bus identified at block 1602 is switched (e.g., via a bus selector 910) between functionality of the first bus and the second bus in response to a desired mode of communication between the at least one managed endpoint and the multi-radio coexistence platform.

Figure 17:
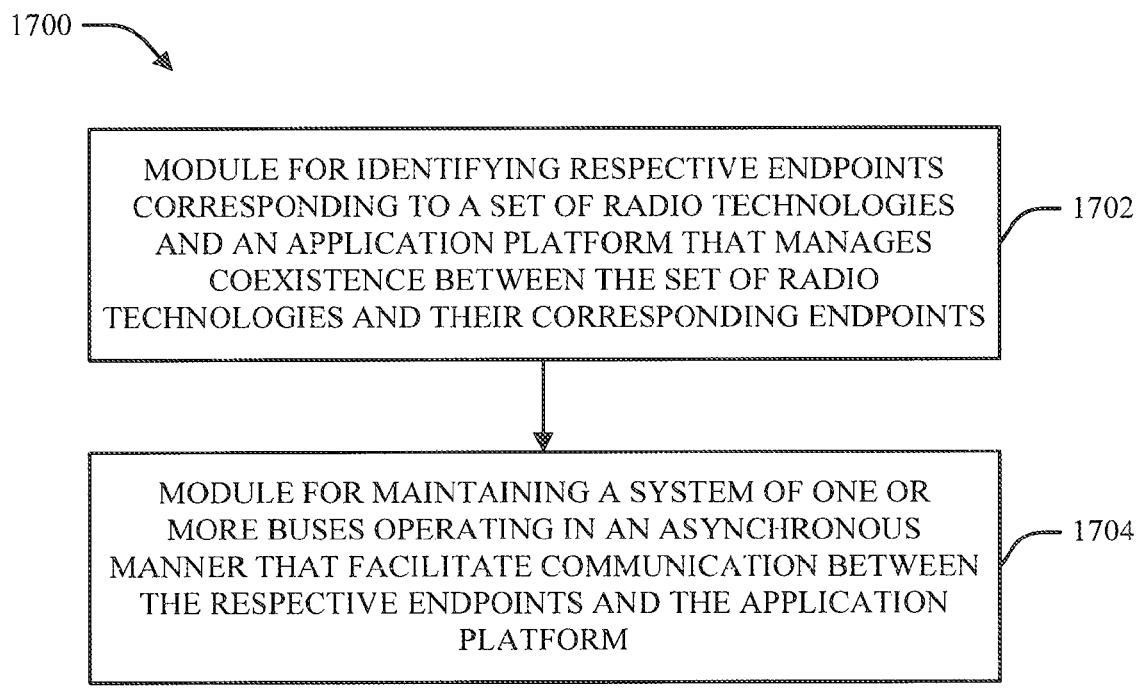
FIG. 17 is a block diagram of an apparatus that facilitates implementation and management of an asynchronous bus architecture for multi-radio coexistence management within a communication system.

Referring now to FIG. 17, an apparatus 1700 that facilitates implementation and management of an asynchronous bus architecture for multi-radio coexistence management within a communication system is illustrated. It is to be appreciated that apparatus 1700 is represented as including functional blocks, which can be functional blocks that represent functions implemented by a processor, software, or combination thereof (e.g., firmware). Apparatus 1700 can be implemented by a wireless device (e.g., wireless device 110 or 200, via a CxM 240) and/or another suitable network device and can include a module 1702 for identifying respective endpoints corresponding to a set of radio technologies and an application platform that manages coexistence between the set of radio technologies and their corresponding endpoints and a module 1704 for maintaining a system of one or more buses operating in an asynchronous manner that facilitate communication between the respective endpoints and the application platform.

With respect to the above description, one of ordinary skill in the art can appreciate that various aspects described above can be implemented by hardware, software, firmware, middleware, microcode, or any combination thereof. When the systems and/or methods are implemented in software, firmware, middleware or microcode, program code or code segments, they can be stored in a machine-readable medium, such as a memory or storage device. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

Moreover, those of skill in the art can appreciate that information and signals can be represented using any of a variety of different technologies and techniques. For example, data, instructions, commands, information, signals, bits, symbols, and/or chips that may be referenced throughout the above description can be represented by voltages, currents, electromagnetic waves, magnetic fields or particles, optical fields or particles, or any combination thereof.

In addition, it is to be understood that the steps of the various methods and/or algorithms as described in connection with the disclosure above can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An example storage medium can be coupled to a processor such that the processor can read information from, and write information to, the storage medium. In the alternative, the storage medium can be integral to the processor. The processor and the storage medium can reside in an ASIC, which in turn can reside in a user terminal and/or in any other suitable location. Alternatively, processor and the storage medium can reside as discrete components in a user terminal.

The above description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is instead to be accorded the widest scope consistent with the principles and novel features disclosed herein. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method used in a wireless communication system, the method comprising:
 identifying respective managed endpoints within a single multi-radio device associated with respective potentially conflicting radio technologies and a multi-radio coexistence platform associated with the respective managed endpoints, wherein the single multi-radio wireless device includes the respective managed endpoints and the multi-radio coexistence platform; and maintaining a unified hardwired bus system that communicatively connects the respective managed endpoints to the multi-radio coexistence platform, wherein the unified hardwired bus system comprises one or more hardwired asynchronous buses on the multi-radio wireless device and wherein the one or more hardwired asynchronous buses operate according to an asynchronous protocol, wherein:

the unified hardwired bus system comprises at least one hardwired bus located on an integrated circuit comprising circuitry for a first plurality of managed endpoints and at least one supplemental bus reprogrammable for operation according to a plurality of operating modes, the plurality of operating modes comprising at least one of a synchronous mode associated with a synchronous protocol or an asynchronous mode associated with the asynchronous protocol, and the at least one supplemental bus is connected to the at least one hardwired bus located on the integrated circuit and to a second plurality of managed endpoints within the single multi-radio device and located external to the integrated circuit.

2. The method of claim 1, wherein the respective managed endpoints comprise at least one of a radio, an antenna, a power amplifier, a filter, a mixer, or a modem.

3. The method of claim 1, wherein the maintaining comprises:

collecting notifications for the multi-radio coexistence platform from at least one of the respective managed endpoints via a first one of the asynchronous buses that communicatively connects the at least one managed endpoint to the multi-radio coexistence platform; and conveying coexistence commands from the multi-radio coexistence platform to the at least one managed endpoint via a second one of the asynchronous buses that communicatively connects the at least one managed endpoint to the multi-radio coexistence platform.

4. The method of claim 3, wherein the maintaining further comprises:

joining the first asynchronous bus and the second asynchronous bus such that the multi-radio coexistence platform is coupled to the first asynchronous bus and the second asynchronous bus and the at least one managed endpoint is coupled to a common bus that implements functionality of the first asynchronous bus and the second asynchronous bus; and switching the common bus between the functionality of the first asynchronous bus and the second asynchronous bus in response to a desired mode of communication between the at least one managed endpoint and the multi-radio coexistence platform.

5. The method of claim 1, wherein the maintaining comprises collecting notifications for the multi-radio coexistence platform from at least one of the respective managed endpoints via at least one of the asynchronous buses that communicatively connects the at least one managed endpoint to the multi-radio coexistence platform; and conveying coexistence commands from the multi-radio coexistence platform to the at least one managed endpoint via the at least one asynchronous bus.

6. The method of claim 1, wherein the maintaining comprises reprogramming the one or more asynchronous buses to operate according to a non-asynchronous bus protocol for at least one decision unit in time.

7. The method of claim 1, wherein the one or more asynchronous buses comprise at least one bus implemented according to a SLIMbus architecture.

8. An apparatus operable in a wireless communication system, comprising:

respective managed endpoints on a single multi-radio wireless device, wherein the respective managed endpoints are associated with potentially conflicting radio technologies;

a coexistence manager (CxM) on the multi-radio wireless device, wherein the CxM facilitates coexistence between the respective managed endpoints; and a unified bus hardwired system that communicatively connects the respective managed endpoints to the CxM, wherein the unified bus hardwired system comprises one or more hardwired asynchronous buses on the multi-radio wireless device and wherein the one or more hardwired asynchronous buses operate according to an asynchronous protocol, wherein:

the unified hardwired bus system comprises at least one hardwired bus located on an integrated circuit comprising circuitry for a first plurality of managed endpoints and at least one supplemental bus reprogrammable for operation according to a plurality of operating modes, the plurality of operating modes comprising at least one of a synchronous mode associated with a synchronous protocol or an asynchronous mode associated with the asynchronous protocol, and the at least one supplemental bus is connected to the at least one hardwired bus located on the integrated circuit and to a second plurality of managed endpoints within the single multi-radio device and located external to the integrated circuit.

9. The apparatus of claim 8, wherein the respective managed endpoints comprise at least one of a radio, an antenna, a power amplifier, a filter, a mixer, or a modem.

10. The apparatus of claim 8, wherein the one or more asynchronous buses comprise:

at least a first asynchronous bus that communicatively connects at least one of the respective managed endpoints to the CxM and collects notifications for the CxM from the at least one managed endpoint; and at least a second asynchronous bus that communicatively connects the at least one managed endpoint to the CxM and conveys coexistence commands from the CxM to the at least one managed endpoint.

11. The apparatus of claim 10, wherein:

the first asynchronous bus and the second synchronous bus are joined such that the CxM is coupled to the first asynchronous bus and the second asynchronous bus and the at least one managed endpoint is coupled to a common bus that implements functionality of the first asynchronous bus and the second asynchronous bus; and the apparatus further comprises a bus selector that switches the common bus between the functionality of the first asynchronous bus and the second asynchronous bus in response to a desired mode of communication between the at least one managed endpoint and the CxM.

12. The apparatus of claim 8, wherein the one or more asynchronous buses comprise at least one asynchronous bus that collects notifications for the CxM from at least one of the respective managed endpoints and conveys coexistence commands from the CxM to the at least one managed endpoint.

13. The apparatus of claim 8, wherein the one or more asynchronous buses comprise at least one bus implemented according to a SLIMbus architecture.

14. An apparatus, comprising:
means for identifying respective endpoints within a single multi-radio device associated with respective radio technologies and an application platform that manages coexistence between the respective radio technologies and their associated endpoints, wherein the single multi-radio wireless device includes the respective endpoints and the application platform; and
means for maintaining a unified hardwired bus system comprising one or more hardwired asynchronous buses on the multi-radio wireless device wherein the one or more hardwired asynchronous buses operate according to an asynchronous protocol and communicatively connect the respective managed endpoints to the application platform, wherein:
the unified hardwired bus system comprises at least one hardwired bus located on an integrated circuit comprising circuitry for a first plurality of managed endpoints and at least one supplemental bus reprogrammable for operation according to a plurality of operating modes, the plurality of operating modes comprising at least one of a synchronous mode associated with a synchronous protocol or an asynchronous mode associated with the asynchronous protocol, and
the at least one supplemental bus is connected to the at least one hardwired bus located on the integrated circuit and to a second plurality of managed endpoints within the single multi-radio device and located external to the integrated circuit.

15. The apparatus of claim 14, wherein the respective endpoints comprise at least one of a radio, an antenna, a power amplifier, a filter, a mixer, or a modem.

16. The apparatus of claim 14, wherein the means for maintaining comprises:
means for collecting notifications for the application platform from at least one of the respective endpoints via a first one of the asynchronous buses that communicatively connects the at least one endpoint to the application platform; and
means for conveying coexistence commands from the application platform to the at least one endpoint via a second one of the asynchronous buses that communicatively connects the at least one endpoint to the application platform.

17. The apparatus of claim 16, wherein the means for maintaining further comprises:
means for joining the first asynchronous bus and the second asynchronous bus such that the application platform is coupled to the first asynchronous bus and the second asynchronous bus and the at least one endpoint is coupled to a common bus that implements functionality of the first asynchronous bus and the second asynchronous bus; and
means for switching the common bus between the functionality of the first asynchronous bus and the second asynchronous bus in response to a desired mode of communication between the at least one endpoint and the application platform.

18. The apparatus of claim 14, wherein the means for maintaining comprises:
means for collecting notifications for the application platform from at least one of the respective endpoints via at least one of the asynchronous buses that communicatively connects the at least one endpoint to the application platform; and
means for conveying coexistence commands from the application platform to the at least one endpoint via the at least one asynchronous bus.

19. A computer program product, comprising:
a non-transitory computer-readable medium, comprising:
code for causing a computer to identify respective endpoints within a single multi-radio device associated with respective radio technologies and an application platform that manages coexistence between the respective radio technologies and their associated endpoints, wherein the single multi-radio wireless device includes the respective endpoints and the application platform; and
code for causing the computer to maintain a unified hardwired bus system comprising one or more hardwired asynchronous buses on the multi-radio wireless device wherein the one or more hardwired asynchronous buses operate according to an asynchronous protocol and communicatively connect the respective managed endpoints to the application platform, wherein:
the unified hardwired bus system comprises at least one hardwired bus located on an integrated circuit comprising circuitry for a first plurality of managed endpoints and at least one supplemental bus reprogrammable for operation according to a plurality of operating modes, the plurality of operating modes comprising at least one of a synchronous mode associated with a synchronous protocol or an asynchronous mode associated with the asynchronous protocol, and
the at least one supplemental bus is connected to the at least one hardwired bus located on the integrated circuit and to a second plurality of managed endpoints within the single multi-radio device and located external to the integrated circuit.

20. The computer program product of claim 19, wherein the respective endpoints comprise at least one of a radio, an antenna, a power amplifier, a filter, a mixer, or a modem.

21. The computer program product of claim 19, wherein the code for causing the computer to maintain comprises:
code for causing the computer to collect notifications for the application platform from at least one of the respective endpoints via a first one of the asynchronous buses that communicatively connects the at least one endpoint to the application platform; and
code for causing the computer to convey coexistence commands from the application platform to the at least one endpoint via a second one of the asynchronous buses that communicatively connects the at least one endpoint to the application platform.

22. The computer program product of claim 21, wherein the code for causing the computer to maintain comprises:
code for causing the computer to join the first asynchronous bus and the second asynchronous bus such that the application platform is coupled to the first asynchronous bus and the second asynchronous bus and the at least one endpoint is coupled to a common bus that implements functionality of the first asynchronous bus and the second asynchronous bus; and
code for causing the computer to switch the common bus between the functionality of the first asynchronous bus and the second asynchronous bus in response to a desired mode of communication between the at least one endpoint and the application platform.

23. The computer program product of claim 19, wherein the code for causing the computer to maintain comprises:
   code for causing the computer to collect notifications for the application platform from at least one of the respective endpoints via at least one of the asynchronous buses that communicatively connects the at least one endpoint to the application platform; and
   code for causing the computer to convey coexistence commands from the application platform to the at least one endpoint via the at least one asynchronous bus.

24. The computer program product of claim 19, wherein the code for causing the computer to maintain comprises code for causing the computer to reprogram the one or more asynchronous buses to operate according to a non-asynchronous bus protocol for at least one decision unit in time.

25. The computer program product of claim 19, wherein the one or more asynchronous buses comprise at least one bus implemented according to a SLIMbus architecture.

26. The computer program product of claim 19, wherein the one or more buses provide a shared multi-drop interface to communicatively connect the respective endpoints and the application platform via one or more of wires or software that emulates hardware.

27. The method of claim 1, wherein the one or more hardwired asynchronous buses provide a shared multi-drop interface to communicatively connect the respective managed endpoints and the multi-radio coexistence platform via one or more of wires or software that emulates hardware.

28. The apparatus of claim 8, further comprising a reprogramming module that reprograms the one or more hardwired asynchronous buses to operate according to a non-asynchronous bus protocol for at least one decision unit in time.

29. The apparatus of claim 8, wherein the one or more hardwired asynchronous buses comprise at least one bus implemented according to a SLIMbus architecture.

30. The apparatus of claim 8, wherein the one or more hardwired asynchronous buses provide a shared multi-drop interface to communicatively connect the respective managed endpoints and the CxM via one or more of wires or software that emulates hardware.

31. The apparatus of claim 14, wherein the means for maintaining comprises means for reprogramming the one or more hardwired asynchronous buses to operate according to a non-asynchronous bus protocol for at least one decision unit in time.

32. The apparatus of claim 14, wherein the one or more hardwired asynchronous buses comprise at least one bus implemented according to a SLIMbus architecture.

33. The apparatus of claim 14, wherein the one or more hardwired asynchronous buses provide a shared multi-drop interface to communicatively connect the respective endpoints and the application platform via one or more of wires or software that emulates hardware.

* * * * *